United States Patent
Guo

(10) Patent No.: US 11,444,800 B2
(45) Date of Patent: Sep. 13, 2022

(54) TOPOLOGY SWITCHING METHOD BASED ON ISOCHRONOUS CHANNEL, APPARATUS, SYSTEM AND STORAGE MEDIUM

(71) Applicant: Shenzhen Goodix Technology Co., Ltd., Shenzhen (CN)

(72) Inventor: Shilin Guo, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/038,408

(22) Filed: Sep. 30, 2020

(65) Prior Publication Data
US 2021/0014081 A1    Jan. 14, 2021

Related U.S. Application Data

(63) Continuation of application No. PCT/CN2019/090119, filed on Jun. 5, 2019.

(51) Int. Cl.
*H04L 12/40* (2006.01)
*H04L 12/403* (2006.01)

(52) U.S. Cl.
CPC ...... *H04L 12/40058* (2013.01); *H04L 12/403* (2013.01); *H04L 12/40019* (2013.01); *H04L 12/40123* (2013.01)

(58) Field of Classification Search
CPC ......... H04L 12/40019; H04L 12/40058; H04L 12/40123; H04L 12/403; H04L 12/12;
(Continued)

(56) References Cited

U.S. PATENT DOCUMENTS 5,943,340 A * 8/1999 Iemura ............... H04W 72/082
                                                      370/431
6,590,928 B1 * 7/2003 Haartsen ............... H04W 84/20
                                                      375/134
(Continued)

FOREIGN PATENT DOCUMENTS

CN    101621836 A    1/2010
CN    103812589 A    5/2014
(Continued)

OTHER PUBLICATIONS

International Search Report dated Feb. 28, 2020 in corresponding International Application No. PCT/CN2019/090119; 10 pages.
(Continued)

*Primary Examiner* — Stephen J Clawson
(74) *Attorney, Agent, or Firm* — Maier & Maier, PLLC

(57) ABSTRACT

Provided are a topology switching method based on isochronous channel, an apparatus, a system and a storage medium. The method is applied to a first central slave device. There are a plurality of first isochronous channels between the first central slave device and a master device, and there is a first communication channel between the first central slave device and a peripheral slave device. The method includes: sending, by first central slave device, first isochronization information to peripheral slave device through the first communication channel, where the first isochronization information includes a channel parameter of first isochronous channel, so that peripheral slave device starts data transmission with master device according to the channel parameter of first isochronous channel; and stopping, by first central slave device, data transmission with master device through the first isochronous channel, before peripheral slave device starts data transmission with master device.

18 Claims, 12 Drawing Sheets

(58) Field of Classification Search
CPC . A61B 8/06; G01F 1/662; G01F 1/663; G01F 1/667; G01S 15/8977; G01S 15/8984; G06T 2207/10132; G06T 2207/30104; G06T 7/246; H04W 40/36; H04W 56/005
See application file for complete search history.

(56) References Cited

U.S. PATENT DOCUMENTS

| | | | |
|---|---|---|---|
| 2003/0003867 A1 | 1/2003 | Kawamura | |
| 2003/0162494 A1* | 8/2003 | Oosugi | H04B 1/202 455/3.06 |
| 2008/0240324 A1* | 10/2008 | Sburlino | G06F 13/12 375/E7.02 |
| 2010/0220650 A1* | 9/2010 | Rison | H04L 5/0044 370/328 |
| 2013/0188575 A1* | 7/2013 | Lee | H04L 1/08 370/329 |
| 2015/0131645 A1 | 5/2015 | Reunamaki et al. | |
| 2017/0251469 A1* | 8/2017 | Lee | H04W 72/0446 |
| 2020/0128617 A1* | 4/2020 | Xian | H04N 21/44004 |

FOREIGN PATENT DOCUMENTS

| | | |
|---|---|---|
| CN | 103916187 A | 7/2014 |
| CN | 108040308 A | 5/2018 |
| WO | 2016003064 A1 | 1/2016 |

OTHER PUBLICATIONS

Search Report dated Jun. 2, 2021 in corresponding European Application No. 19929196.4; 6 pages.
Office Action dated Dec. 1, 2021, in connection with corresponding Chinese Application No. 201980001046.6 (21 pp., including machine-generated English translation).

* cited by examiner

TOPOLOGY SWITCHING METHOD BASED ON ISOCHRONOUS CHANNEL, APPARATUS, SYSTEM AND STORAGE MEDIUM

CROSS-REFERENCE TO RELATED APPLICATIONS

This application is a continuation of the International application PCT/CN2019/090119, filed on Jun. 5, 2019, entitled "TOPLOGY SWITCHING METHOD BASED ON ISOCHRONOUS CHANNEL, APPARATUS, SYSTEM AND STORAGE MEDIUM", the content of which is hereby incorporated by reference in its entirety.

TECHNICAL FIELD

The present application relates to the field of wireless communication technology, and in particular to a topology switching method based on an isochronous channel, an apparatus, a system and a storage medium.

BACKGROUND

With the development of communication technology, wireless data communication has entered an outbreak period, and applications based on wireless data communication can be seen everywhere, such as personal applications of wireless earphones based on audio. Wireless personal area network (Wireless Personal Area Network, abbreviated as WPAN) is a widely used wireless data communication mode. WPAN is used for communication between devices such as a telephone, a computer, an accessory device, and a digital assistant device within a small scale (the working range of a personal local area network is generally within 10 meters). Through WPAN, point-to-point data interaction can be realized between devices, such as wireless network data interaction between a mobile terminal and a wireless earphone. In WPAN, a universal wireless channel can adopt a wireless channel mode such as wireless-fidelity (Wireless-Fidelity, WIFI), infrared data association (Infrared Data Association, IrDA) or Bluetooth.

In the prior art, during wireless group data transmission, devices applied in different scenarios need to perform group channel topology updating and role conversion according to use conditions, channel topology, number of devices, etc. When a topological structure is converted, it is usually necessary to disconnect all isochronous group channels first, and then recreate all channels with a new topological structure.

However, in the prior art, during a switching process of an isochronous group channel topology, isochronous group channel data transmission will be interrupted. Therefore, the switching efficiency of the isochronous group channel topology is relatively low.

SUMMARY

The present application provides a topology switching method based on an isochronous channel, an apparatus, a system and a storage medium, which improve the switching efficiency of an isochronous channel topology.

In a first aspect, the present application provides a topology switching method based on an isochronous channel, where the method is applied to a first central slave device; there are a plurality of first isochronous channels between the first central slave device and a master device, and there is a first communication channel between the first central slave device and a peripheral slave device; where the method includes:

sending, by the first central slave device, first isochronization information to the peripheral slave device through the first communication channel between the first central slave device and the peripheral slave device, where the first isochronization information includes a channel parameter of a first isochronous channel, so that the peripheral slave device starts data transmission with the master device according to the channel parameter of the first isochronous channel; stopping, by the first central slave device, data transmission with the master device through the first isochronous channel, before the peripheral slave device starts the data transmission with the master device according to the channel parameter of the first isochronous channel.

In this solution, the first central slave device sends the first isochronization information to the peripheral slave device, so that the peripheral slave device starts the data transmission with the master device according to the channel parameter of the first isochronous channel And before the peripheral slave device starts the data transmission with the master device according to the channel parameter of the first isochronous channel, the first central slave device stops the data transmission with the master device through the first isochronous channel. The connection between the master device and the slave device is avoided to be disconnected during the process of establishing the isochronous channel between the master device and the newly added slave device, thereby improving the switching efficiency of an isochronous channel topology.

Optionally, the channel parameter of the first isochronous channel includes: a first data access address;

the first data access address is used to enable the peripheral slave device to start the data transmission with the master device according to the first data access address; where the first central device stops, according to the first data access address, the data transmission with the master device through the first isochronous channel after the first central slave device sends the first data access address to the peripheral slave device, so that the peripheral slave device starts the data transmission with the master device according to the first data access address.

Optionally, the first isochronization information further includes first isochronization time information, and the stopping, by the first central slave device, the data transmission with the master device through the first isochronous channel includes:

determining, by the first central slave device and according to the channel parameter of the first isochronous channel, the first isochronous channel that is used for the data transmission with the master device and is to be stopped; determining, by the first central slave device and according to the first isochronization time information, a stop time of stopping the data transmission with the master device through the first isochronous channel, where the stop time is after completing transmitting an (N−1)th frame of data between the first central slave device and the master device, and the stop time is before starting to transmit an Nth frame of data between the peripheral slave device and the master device; stopping, by the first central slave device, the data transmission with the master device through the first isochronous channel at the stop time.

Optionally, the first isochronization time information includes:

a sending time when the first central slave device sends the first isochronization information to the peripheral slave device, and a time difference between the sending time and a time of starting the data transmission between the peripheral slave device and the master device.

Optionally, the topology switching method based on an isochronous channel provided by an embodiment of the present application further includes:

receiving, by the first central slave device, a channel isochronization success message or a channel isochronization failure message sent by the peripheral slave device, where the channel isochronization success message is used to confirm success of the data transmission between the peripheral slave device and the master device, and the channel isochronization failure message is used to confirm failure of the data transmission between the peripheral slave device and the master device.

Optionally, the topology switching method based on an isochronous channel provided by an embodiment of the present application further includes:

receiving, by the first central slave device, second isochronization information sent by the peripheral slave device, where the second isochronization information includes a channel parameter of a second isochronous channel, the second synchronization channel is an isochronous channel between the peripheral slave device and the master device, and the second isochronous channel is used for data transmission between the peripheral slave device and the master device; making the peripheral slave device stop the data transmission with the master device through the second isochronous channel, before the first central slave device starts data transmission with the master device according to the channel parameter of the second isochronous channel; disconnecting, by the first central slave device, the first communication channel between the peripheral slave device and the first central slave device.

In this solution, departure or deletion of the peripheral slave device is achieved, and interruption of data transmission between the master device and the slave device is avoided, thereby improving the switching efficiency of the isochronous channel topology.

Optionally, the step of the peripheral slave device starting the data transmission with the master device according to the channel parameter of the first isochronous channel includes:

establishing, by the peripheral slave device, the second isochronous channel with the master device according to the channel parameter of the first isochronous channel; the stopping, by the first central slave device, the data transmission with the master device through the first isochronous channel includes: disconnecting, by the first central slave device, the first isochronous channel with the master device.

Optionally, the channel parameter of the second isochronous channel includes: a second data access address, and the topology switching method based on an isochronous channel provided by an embodiment of the present application further includes:

making the peripheral slave device stop the data transmission with the master device through the second isochronous channel; starting, by the first central slave device, the data transmission with the master device according to the second data access address, after the first central slave device receives the second isochronization information sent by the peripheral slave device.

Optionally, the topology switching method based on an isochronous channel provided by an embodiment of the present application further includes:

selecting, by the first central slave device, one peripheral slave device from the peripheral slave device as a second central slave device; sending, by the first central slave device, third isochronization information to the second central slave device, where the third isochronization information is transmitted through the first communication channel between the second central slave device and the first central slave device, and the third isochronization information includes the channel parameter of the first isochronous channel and third isochronization time information; stopping, by the first central slave device and according to the third isochronization information, the data transmission with the master device through the first isochronous channel, and making the second central slave device start data transmission with the master device; disconnecting, by the first central slave device, the first communication channel between the first central slave device and the second central slave device.

In this solution, departure or deletion of the central slave device is achieved, and interruption of data transmission between the master device and the slave device is avoided during the departure or deletion of the central slave device, thereby improving the switching efficiency of the isochronous channel topology.

Optionally, before sending, by the first central slave device, the first isochronization information to the peripheral slave device through the first communication channel between the first central slave device and the peripheral slave device, the method further includes:

scanning, by the first central slave device, identity information of the peripheral slave device; identifying, by the first central slave device, the identity information of the peripheral slave device; establishing the first communication channel between the peripheral slave device and the first central slave device, if the identity information of the peripheral slave device passes the identification.

Optionally, before sending, by the first central slave device, the first isochronization information to the peripheral slave device through the first communication channel between the first central slave device and the peripheral slave device, the method further includes:

scanning, by the first central slave device, identity information of the peripheral slave device, and establishing the first communication channel between the peripheral slave device and the first central slave device; identifying, by the first central slave device, the identity information of the peripheral slave device; disconnecting the first communication channel between the peripheral slave device and the first central slave device, if the identity information of the peripheral slave device fails to pass the identification.

Optionally, the topology switching method based on an isochronous channel provided by an embodiment of the present application further includes:

when the first central slave device fails to receive data sent by the master device through the first isochronous channel, sending, by the first central slave device, a data request message to the master device through the first isochronous channel until the number of times the master device resending data requested by the data request message exceeds a preset threshold or until the first central slave device receives the data requested by the data request message, where the data request message is used to request the master device to resend the data requested by the data request message.

Optionally, the topology switching method based on an isochronous channel provided by an embodiment of the present application further includes:

sending, by the first central slave device, a first request message to the master device through the second communication channel between the first central slave device and the master device, where the first request message is used to request to establish the plurality of first isochronous channels; receiving, by the first central slave device, a response message sent by the master device through the second communication channel, where the response message is used to instruct to establish the plurality of first isochronous channels.

In a second aspect, the present application provides a topology switching method based on an isochronous channel, where the method is applied to a peripheral slave device there is a first communication channel between the peripheral slave device and a first central slave device, and there are a plurality of isochronous channels between the first central slave device and a master device; where the method includes:

obtaining, by the peripheral slave device, first isochronization information from the first central slave device, where the first isochronization information includes a channel parameter of the first isochronous channel; and making the first central slave device stop data transmission with the master device through the first isochronous channel, before the peripheral slave device starts data transmission with the master device according to the channel parameter of the first isochronous channel; starting, by the peripheral slave device, the data transmission with the master device according to the channel parameter of the first isochronous channel.

Optionally, in the topology switching method based on isochronous channel provided by an embodiment of the present application:

the channel parameter of the first isochronous channel includes: a first data access address, and the first data access address is used to enable the peripheral slave device to start the data transmission with the master device according to the first data access address; where the peripheral slave device receives the first data access address, so that the first central slave device stops, according to the first data access address, the data transmission with the master device through the first isochronous channel, and the peripheral slave device starts the data transmission with the master device according to the first data access address.

Optionally, the first isochronization information includes first isochronization time information, and the starting, by the peripheral slave device, the data transmission with the master device according to the channel parameter of the first isochronous channel includes:

determining, by the peripheral slave device and according to the first isochronization time information, a start time of starting the data transmission with the master device, where the start time is after completing transmitting an (N−1)th frame of data between the first central slave device and the master device through the first isochronous channel, and the start time is after the first central slave device stops the data transmission with the master device through the first isochronous channel; starting, by the peripheral slave device, to transmit an Nth frame of data with the master device according to the channel parameter of the first isochronous channel at the start time.

Optionally, the first isochronization time information includes:

a sending time when the first central slave device sends the first isochronization information to the peripheral slave device, and a time difference between the sending time and a time of starting the data transmission between the peripheral slave device and the master device.

Optionally, the topology switching method based on an isochronous channel provided by an embodiment of the present application further includes:

sending, by the peripheral slave device, a channel isochronization success message or a channel isochronization failure message to the first central slave device, where the message channel isochronization success message is used to confirm success of the data transmission between the peripheral slave device and the master device, and the channel isochronization failure message is used to confirm failure of the data transmission between the peripheral slave device and the master device.

Optionally, the topology switching method based on an isochronous channel provided by an embodiment of the present application further includes:

sending, by the peripheral slave device, second isochronization information to the first central slave device, where the second isochronization information includes a channel parameter of a second isochronous channel, and the second isochronous channel is an isochronous channel between the peripheral slave device and the master device; stopping, by the peripheral slave device and according to the second isochronization information, the data transmission with the master device through the second isochronous channel, and making the first central slave device start the data transmission with the master device; disconnecting, by the peripheral slave device, the first communication channel between the peripheral slave device and the first central slave device.

the starting, by the peripheral slave device, the data transmission with the master device according to the channel parameter of the first isochronous channel includes: establishing, by the peripheral slave device, a second isochronous channel with the master device according to the channel parameter of the first isochronous channel, where the second isochronous channel is used for the data transmission between the peripheral slave device and the master device; the step of the first central slave device stopping the data transmission with the master device through the first isochronous channel includes: disconnecting, by the first central slave device, the first isochronous channel between the first central slave device and the master device.

Optionally, the topology switching method based on an isochronous channel provided by an embodiment of the present application further includes:

receiving, by a second central slave device, third isochronization information sent by the first central slave device, where the second central slave device is any one of the peripheral slave device, the third isochronization information is transmitted through the first communication channel between the second central slave device and the first central slave device, and the third isochronization information includes the channel parameter of the first isochronous channel; starting, by the second central slave device, data transmission with the master device according to the third isochronization information, and making the first central slave device stop the data transmission with the master device through the first isochronous channel; disconnecting, by the second central slave device, the first communication channel between the first central slave device and the second central slave device.

Optionally, in the topology switching method based on an isochronous channel provided by an embodiment of the present application:

the third isochronization information further includes third isochronization time information, so that the first central slave device determines, according to the third isochronization time information, a stop time of stopping the data transmission with the master device through the first isochronous channel, where the stop time is after completing transmitting an (M−1)th frame of data between the first central slave device and the master device, and the stop time is before starting to transmit an Mth frame of data between the second central slave device and the master device.

Optionally, the third isochronization time information includes:

a sending time when the first central slave device sends the third isochronization information to the second central slave device, and a time difference between the sending time and a time of starting the data transmission between the second central slave device and the master device.

Optionally, the topology switching method based on an isochronous channel provided by an embodiment of the present application further includes:

sending, by the peripheral slave device, identity information of the peripheral slave device to the first central slave device, so that the first central slave device scans and identifies the identity information of the peripheral slave device, to establish the first communication channel between the peripheral slave device and the first central slave device.

Optionally, the topology switching method based on an isochronous channel provided by an embodiment of the present application further includes:

when the peripheral slave device fails to receive data sent by the master device through the second isochronous channel, sending, by the peripheral slave device, a data request message to the master device through the second isochronous channel until the number of times of the master device resending data requested by the data request message exceeds a preset threshold or until the peripheral slave device receives the data requested by the data request message, where the data request message is used to request the master device to resend the data requested by the data request message.

The following are a topology switching apparatus based on an isochronous channel, a chip, a system, a storage media, and a computer program product provided by embodiments of the present application. For the content and effect thereof, please refer to the topology switching method based on an isochronous group channel provided in the first aspect or the second aspect.

In a third aspect, the present application provides a topology switching apparatus based on an isochronous channel, configured to execute the topology switching method based on an isochronous group channel according to the first aspect or optional implementations of the first aspect.

In a fourth aspect, the present application provides a topology switching apparatus based on an isochronous channel, configured to execute the topology switching method based on an isochronous group channel according to the second aspect or optional implementations of the second aspect.

In a fifth aspect, the present application provides a chip for executing the topology switching method based on an isochronous channel according to the first aspect or optional implementations of the first aspect.

In a sixth aspect, the present application provides a chip for executing the topology switching method based on an isochronous channel according to the second aspect or optional implementations of the second aspect.

In a seventh aspect, the present application provides a central slave device, including the chip provided in the fifth aspect of the present application.

In an eighth aspect, the present application provides a peripheral slave device, including the chip provided in the sixth aspect of the present application.

In a ninth aspect, the present application provides a system, including a master device, the central slave device provided in the seventh aspect of the present application, and at least one peripheral slave device provided in the eighth aspect of the present application; where there are a plurality of isochronous channels between the central slave device and the master device, and there is a first communication channel between the central slave device and each of the at least one peripheral slave device.

In a tenth aspect, the present application provides a computer storage medium, where the storage medium includes computer instructions which, when executed by a computer, cause the computer to implement the method according to the first aspect or optional implementations of the first aspect.

In an eleventh aspect, the present application provides a computer storage medium, where the storage medium includes computer instructions which, when executed by a computer, cause the computer to implement the method according to the second aspect or optional implementations of the second aspect.

In a twelfth aspect, the present application provides a computer program product, including computer instructions which, when executed by a computer, cause the computer to implement the method according to the first aspect or optional implementations of the first aspect.

In a thirteenth aspect, the present application provides a computer program product, including computer instructions which, when executed by the computer, cause the computer implement the method according to the second aspect or optional implementations of the second aspect.

The present application provides a topology switching method based on an isochronous channel, an apparatus, a system, and a storage medium. The method is applied to a first central slave device, where there are a plurality of first isochronous channels between the first central slave device and a master device, and there is a first communication channel between the first central slave device and a peripheral slave device. The method includes: sending, by the first central slave device, first isochronization information to the peripheral slave device through the first communication channel between the first central slave device and the peripheral slave device, where the first isochronization information includes a channel parameter of a first isochronous channel, so that the peripheral slave device starts data transmission with the master device according to the channel parameter of the first isochronous channel; stopping, by the first central slave device, data transmission with the master device through the first isochronous channel, before the peripheral slave device starts the data transmission with the master device according to the channel parameter of the first isochronous channel. Since the first central slave device sends the first isochronization information to the peripheral slave device, the peripheral slave device starts the data transmission with the master device according to the channel parameter of the first isochronous channel, and before the peripheral slave device starts the data transmission with the master device according to the channel parameter of the first isochronous channel, the first central slave device stops the data transmission with the master device through the first isochronous channel. The data transmission between the master device and the slave device is avoided to be disconnected during the process of establishing the isochronous channel between the master device and the newly added slave device, thereby improving the switching efficiency of the isochronous channel topology.

BRIEF DESCRIPTION OF DRAWINGS

In order to describe the technical solutions in embodiments of the present application or the prior art more clearly, the following will briefly introduce the drawings that need to be used in the description of the embodiments or the prior art. Obviously, the drawings in the following description are some embodiments of the present application. For those of ordinary skill in the art, other drawings can be obtained based on these drawings without creative effort.

DETAILED DESCRIPTION OF EMBODIMENTS

Figure 1:
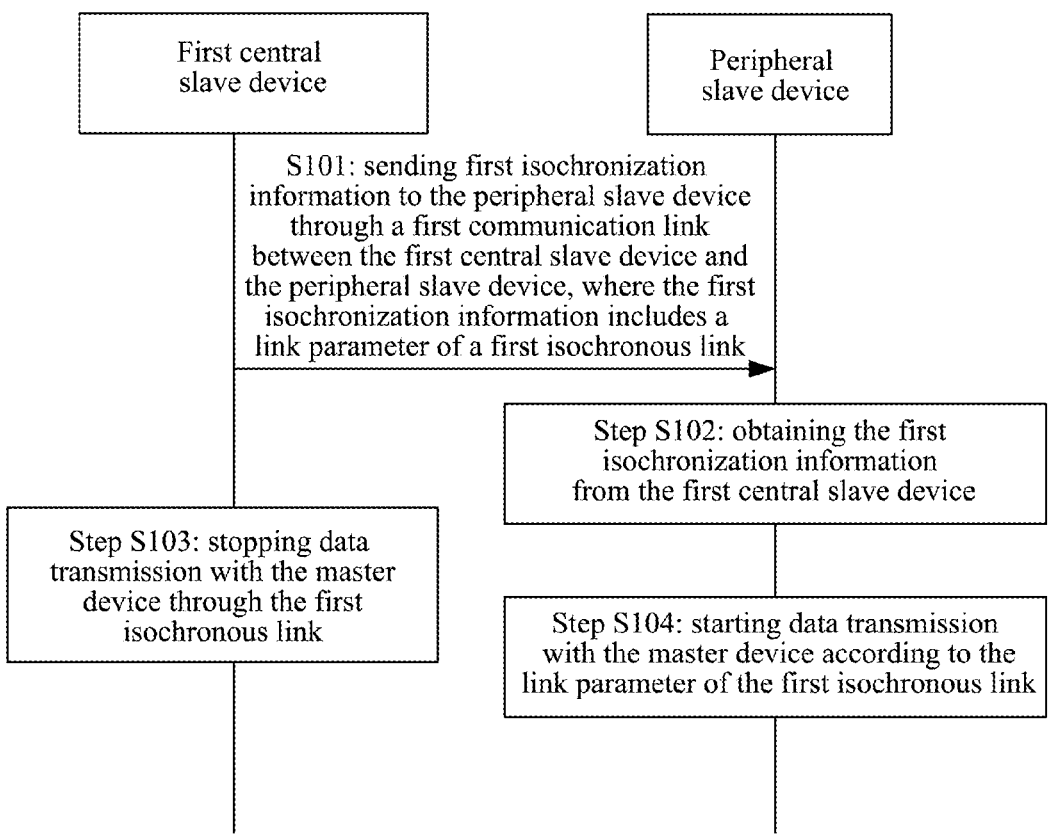
FIG. 1 is an interaction flowchart of a topology method based on an isochronous channel provided by an embodiment of the present application.

In order to make the purpose, technical solutions, and advantages of embodiments of the present application more clearly, the technical solutions in the embodiments of the present application will be described clearly and completely in conjunction with the drawings in the embodiments of the present application. Obviously, the described embodiments are part of the embodiments of the present application, rather than all of the embodiments. Based on the embodiments in the present application, all other embodiments obtained by those of ordinary skill in the art without creative effort shall fall within the protection scope of the present application.

The terms "first", "second", "third", "fourth", etc. (if any) in the description and claims and the above-mentioned drawings of the present application are used to distinguish similar objects, and need not be used to describe a specific order or sequence. It should be understood that the terms used in this way may be interchanged under appropriate circumstances, so that the embodiments of the present application described herein can be implemented for example in a sequence other than those illustrated or described herein. In addition, the terms "include" and "have" and any variations of them are intended to cover a non-exclusive inclusion, for example, processes, methods, systems, products or devices that include a series of steps or units are not necessarily limited to those clearly listed steps or units, but may include other steps or units that are not clearly listed or are inherent to these processes, methods, products or devices.

With the development of communication technology, wireless data communication has entered an outbreak period, and applications based on wireless data communication can be seen everywhere, such as wireless network data interaction between a mobile terminal and a wireless earphone. In WPAN, a universal wireless channel can adopt a wireless channel mode such as wireless-fidelity (Wireless-Fidelity, WIFI), infrared data association (Infrared Data Association IrDA) or Bluetooth. During wireless group data transmission, devices applied in different scenarios need to perform group channel topology updating and role conversion according to use conditions, channel topology, number of devices, etc. However, when a topological structure is converted, it is usually necessary to disconnect all isochronous group channels first, and then recreate all channels with a new topological structure, and the switching efficiency of an isochronous group channel topology is relatively low. In order to solve the above technical problems, the present application provides a topology switching method based on an isochronous channel, an apparatus, a system, and a storage medium.

Exemplary application scenarios of the embodiments of the present application will be introduced hereinafter.

The introduction is conducted by taking wireless network data interaction between a terminal device and a wireless earphone as an example. The terminal device may be a master device in an embodiment of the present application. For example, the master device may be a smart phone, a music player, a video player, a tablet, a personal computer, a vehicle terminal, a wearable device, a medical device and other devices with data processing and communication functions; a wireless earphone may be a slave device in an embodiment of the present application. For example, the slave device may be a device that can receive data from the master device, such as a true wireless stereo (True Wireless Stereo, TWS), a speaker, etc., which is not limited in the embodiments of the present disclosure. For example, an isochronous channel topology will switch, in a case that in a process of one earphone being used for playing music, the other earphone is taken out and used for playing the music, or, in a case that when two earphones are used for playing music, one earphone is removed and put back in a box for charging or the power of an earphone is exhausted, etc. Based on this, the present application provides a topology switching method based on an isochronous channel, an apparatus, a system and a storage medium.

Based on the above application scenarios, the technical solutions of the present application are described in detail as follows.

FIG. 1 is an interaction flowchart of a topology method based on an isochronous channel provided by an embodiment of the present application, where the method can be executed by a topology apparatus based on an isochronous channel, and the apparatus can be implemented by software and/or hardware. The present application takes a slave device as an executive entity to introduce the topology switching method based on an isochronous channel provided in the present application. As shown in FIG. 1, the method includes the following steps.

Step S101: a first central slave device sends first isochronization information to a peripheral slave device through a first communication channel between the first central slave device and the peripheral slave device; where the first isochronization information includes a channel parameter of a first isochronous channel.

Figure 2A:
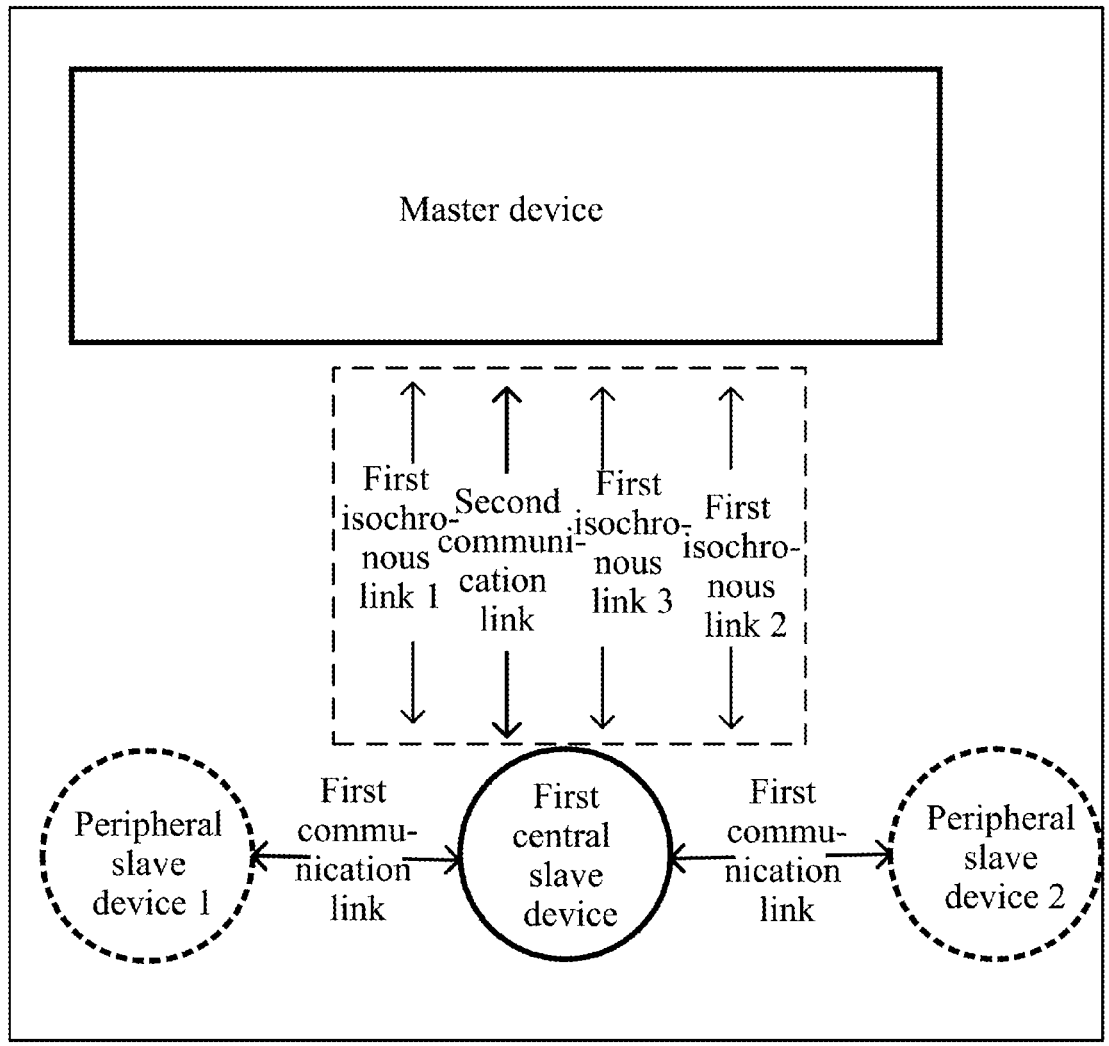
FIG. 2A is a schematic diagram of a topological structure based on an isochronous channel provided by an embodiment of the present application.

The topology switching method based on an isochronous channel provided by the embodiment of the present application is applied to the slave device. The slave device may include the first central slave device and the peripheral slave device. There are a plurality of first isochronous channels between the first central slave device and the master device, and there is a first communication channel between the first central slave device and the peripheral slave device. In order to facilitate the introduction of the topology switching method based on an isochronous channel provided by the embodiments of the present application, the following description will be conducted in combination with a topological structure based on an isochronous channel FIG. 2A is a schematic diagram of a topological structure based on an isochronous channel provided by an embodiment of the present application. As shown in FIG. 2A, there are a plurality of first isochronous channels between the first central slave device and the master device, including a first isochronous channel 1, a first isochronous channel 2 and a first isochronous channel 3, and the plurality of first isochronous channels are used to transmit isochronous data streams, respectively, such as audio data streams, which is not limited in the embodiments of the present application. Optionally, each isochronous channel is used to transmit data stream information of a different channel. There is one first communication channel between the first central slave device and at least one peripheral slave device, respectively. The first communication channel is used to transmit first isochronization information, etc. The first isochronization information includes a channel parameter of the first isochronous channel, for example, an access code, frequency information, a coding rule and others of the first isochronous channel, and is used to realize that the peripheral slave device starts data transmission with the master device according to the channel parameter of the first isochronous channel Therefore, before the step S101, the first communication channel between the peripheral slave device and the first central slave device needs to be established. The embodiments of the present application do not limit the specific implementation of how to establish the first communication channel between the peripheral slave device and the first central slave device.

In a possible implementation, the peripheral slave device sends identity information of the peripheral slave device to the first central slave device, and the first central slave device scans the identity information of the peripheral slave device; the first central slave device identifies the identity information of the peripheral slave device; if the identity information of the peripheral slave device passes the identification, the first communication channel between the peripheral slave device and the first central slave device is established. In this embodiment, the first central slave device can identify the identity information of the peripheral slave device through a UUID (Universally Unique Identifier, universally unique identifier).

In another possible implementation, the peripheral slave device sends identity information of the peripheral slave device to the first central slave device, and the first central slave device scans the identity information of the peripheral slave device and establishes a first communication channel between the peripheral slave device and the first central slave device; the first central slave device identifies the identity information of the peripheral slave device; if the identity information of the peripheral slave device fails to pass the identification, the first communication channel between the peripheral slave device and the first central slave device is disconnected. In this embodiment, after the first communication channel between the peripheral slave device and the first central slave device is established, signaling can be sent through the first communication channel to query the identity information of the peripheral slave device. If the received identity information of the peripheral slave device can be identified by the first central slave device, it is proved that the peripheral slave device is a target device. If the identity information of the peripheral slave device fails to pass the identification, it is proved that the peripheral slave device is a non-target device, and then the first communication channel between the peripheral slave device and the first central slave device is disconnected.

Figure 3:
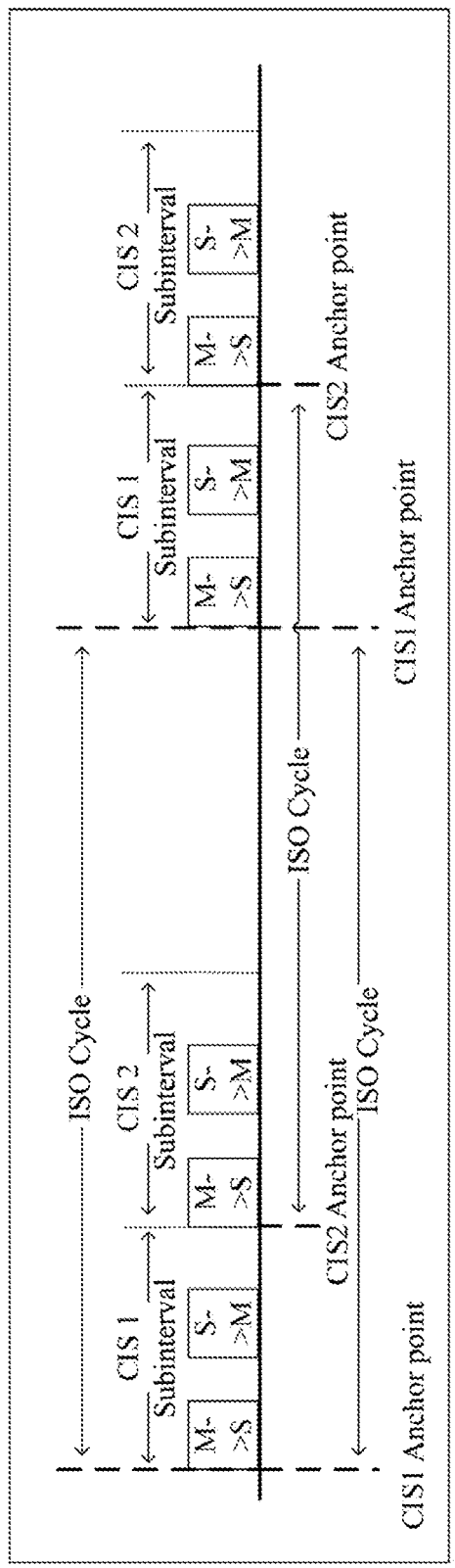
FIG. 3 is a logic diagram of timing interaction based on an isochronous channel provided in FIG. 2A.

There is a second communication channel between the first central slave device and the master device. Information transmitted by the second communication channel may include, but be not limited to, information such as time information, frequency information, a coding rule and encryption information, which is used to realize communication between the first central slave device and the master device. The first communication channel and the second communication channel may be channels that use the same communication mode and communication protocol, or channels that use different communication modes and communication protocols. For example, the first communication channel and the second communication channel may be a Bluetooth physical channel (Asynchronous Connectionless, ACL), and isochronous channels may be a connected isochronous group (Connected Isochronous Group, CIG) or a broadcast isochronous group (Broadcast Isochronous Group, BIG). If the isochronous channels are a CIG, each channel in the isochronous group channels is a connected isochronous stream (Connected Isochronous Stream, CIS), and if the isochronous channels are a BIG, then each channel in the isochronous group channels is a broadcast isochronous stream (Broadcast Isochronous Stream, BIS), etc., which is not limited in the embodiments of the present application. In the embodiments of the present application, an isochronous channel CIG is taken as an example for introduction. Further, in order to facilitate understanding of a data transmission process based on an isochronous channel, an introduction is given below according to FIG. 3. FIG. 3 is a logic diagram of timing interaction based on an isochronous channel provided in FIG. 2A. One CIG can include a plurality of CIS channels. One master device and a slave device establish a timing interaction logic of a CIG topology that includes a plurality of CIS isochronous channels. As shown in FIG. 3, in one isochronous channel (Isochronous Channel, ISO) interval, there may be a plurality of CIS subintervals. In one CIS subinterval, the master device sends data to the slave device (M→S). After receiving the data, the slave device sends data to the master device (S→M). A time when the master device sends the data to the slave device is a CIS anchor point. For example, a CIS1 anchor point is a time when the master device sends data to the slave device through an isochronous channel CIS1. An interval time between the master device sending data to the slave device through the isochronous channel CIS twice is an ISO interval.

Figure 4:
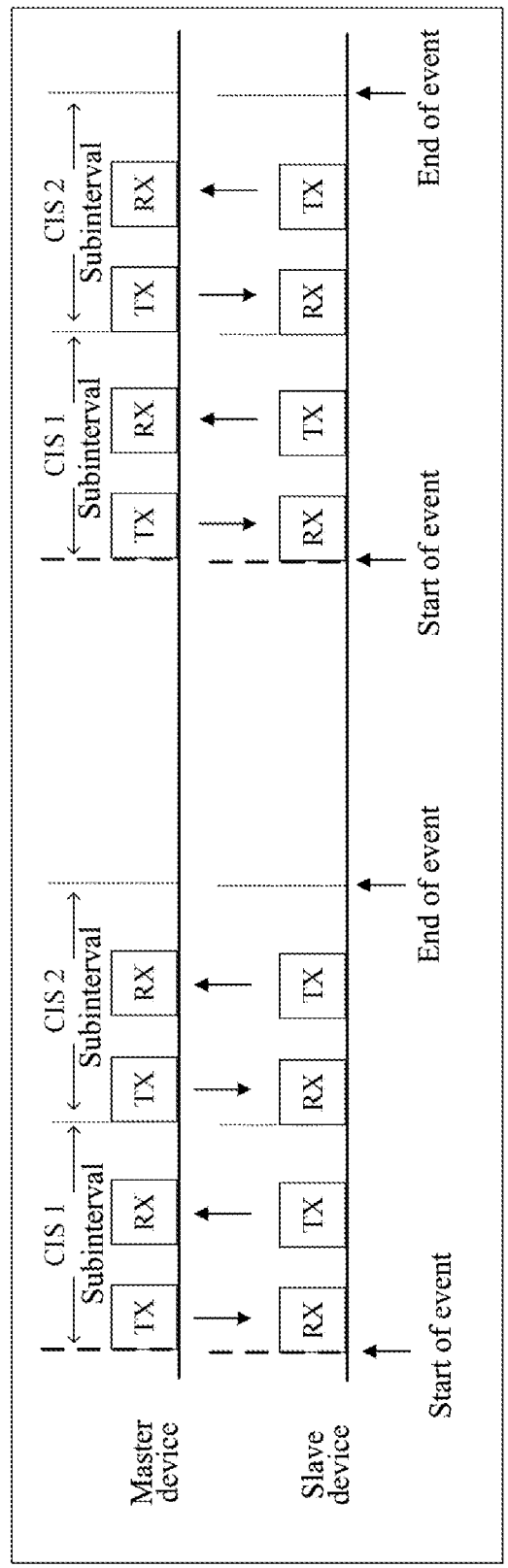
FIG. 4 is a timing diagram of data receiving and sending based on an isochronous channel provided in FIG. 2A.

In order to facilitate the introduction of a data transmission process between the master device and one slave device, FIG. 4 is a timing diagram of data receiving and sending based on an isochronous channel provided in FIG. 2A. As shown in FIG. 4, in a CIS1 subinterval or a CIS2 subinterval, an event begins when the master device sends data to the slave device (TX); the slave device receives the data (RX) and sends data to the master device (TX); and the master device receives the data sent by the slave device (RX). After a plurality of isochronous channel CISs complete the above process of sending and receiving data, the event ends. Then the next event proceeds, and so on, which will not be repeated.

The first central slave device can be a first slave device that establishes a connection with the master device, and the peripheral slave device can be a non-first slave device that establishes a connection with the master device. A plurality of first isochronous channels can be established between the first central slave device and the master device. The embodiments of the present application do not limit the manner in which a plurality of first isochronous channels are established between the first central slave device and the master device. In a possible implementation, the first central slave device sends a first request message to the master device through a second communication channel between the first central slave device and the master device, where the first request message is used to request to establish a plurality of first isochronous channels; the first central slave device receives a response message sent by the master device through the second communication channel, where the response message is used to instruct to establish a plurality of first isochronous channels, which is not limited in the embodiments of the present application.

The first central slave device sends corresponding first isochronization information to at least one peripheral slave device, respectively. The first isochronization information may include a channel parameter of the first isochronous channel, and the channel parameter of the first isochronous channel may include information such as the nearest anchor point of the current first isochronous channel, an anchor point that needs to be isochronized and a time difference (offset) between two anchor points, an event counter (Event Counter), ISO interval time. In addition, the first central slave device can send the above information to the peripheral slave device in the form of air interface data packets. The embodiments of the present disclosure do not limit the specific content and form of the channel parameter of the first isochronous channel. Optionally, the channel parameter of the first isochronous channel may also include information such as a frequency modulation map (ch map), the number of subevents (nse), the number of data packets that need to be transmitted in each event (bn), and an interval (interval). In another possible implementation, the channel parameter of the first isochronous channel includes: a first data access address; the first data access address is used to enable the peripheral slave device to start data transmission with the master device according to the first data access address; after the first central slave device sends the first data access address to the peripheral slave device, the first central slave device stops the data transmission with the master device through the first isochronous channel according to the first data access address, so that the peripheral slave device starts data transmission with the master device according to the first data access address. In an implementation of the present application, the first central slave device can also stop, according to the first data access address, data transmission with the master device through the first isochronous channel before the first central slave device sends the first data access address to the peripheral slave device, that is, the first central slave device can also stop the data transmission with the master device through the first synchronization channel according to the first data access address, and then send the first data access address to the peripheral slave device. In addition, in the embodiment of the present application, after the first data access address is sent to the peripheral slave device, the first central slave device cannot perform data transmission with the master device, and the master device will perform data transmission with the peripheral slave device having the first data access address. The implementation of the present application does not limit the representation of the first data access address, for example, it may be a cut-in code (aa), an access code or other address patterns.

Step S102: The peripheral slave device obtains the first isochronization information from the first central slave device.

The peripheral slave device obtains the channel parameter of the first isochronous channel from the first central slave device through the first communication channel. This is not limited in the embodiments of the present application.

Step S103: The first central slave device stops data transmission with the master device through the first isochronous channel.

The embodiments of the present application do not limit the specific implementation in which the first central slave device stops the data transmission with the master device through the first isochronous channel. In a possible implementation, the first isochronization information also includes first isochronization time information, and the step of the first central slave device stopping the data transmission with the master device through the first isochronous channel includes that:

the first central slave device determines, according to the channel parameter of the first synchronization channel, the first isochronous channel that is used for the data transmission with the master device and is to be stopped; the first central slave device determines, according to the first isochronization time information, a stop time of stopping the data transmission with the master device through the first isochronous channel, where the stop time is after completing transmitting an (N−1)th frame of data between the first central slave device and the master device, and the stop time is before starting to transmit an Nth frame of data between the peripheral slave device and the master device; the first central slave device stops the data transmission with the master device through the first isochronous channel at the stop time.

Figure 2B:
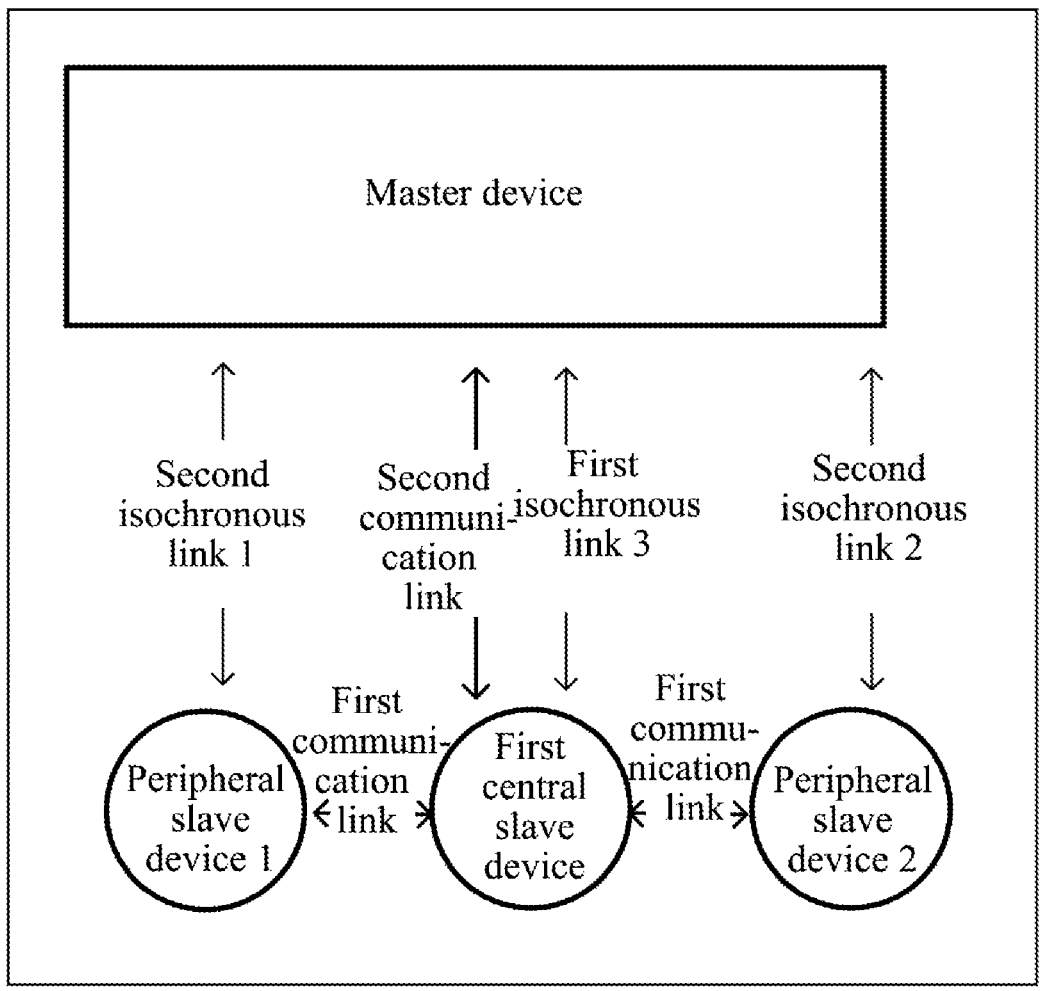
FIG. 2B is a schematic diagram of a topological structure based on an isochronous channel provided by another embodiment of the present application.

According to the channel parameter of the first isochronous channel, the first central slave device determines the first isochronous channel that is used for the data transmission with the master device and is to be stopped. In order to facilitate the introduction of the step S103 and the step S104, FIG. 2B is a schematic diagram of a topological structure based on an isochronous channel provided by another embodiment of the present application. As shown in FIG. 2B, taking the joining of a peripheral slave device 1 as an example, the first central slave device determines according to the channel parameter of the first isochronous channel that the first isochronous channel that is used for the data transmission with the master device and is to be stopped is a first isochronous channel 1. According to the first isochronization time information, the first central slave device determines the stop time of stopping data transmission with the master device through the first isochronous channel 1; and the first central slave device stops the data transmission with the master device through the first isochronous channel 1 at the stop time.

Figure 5:
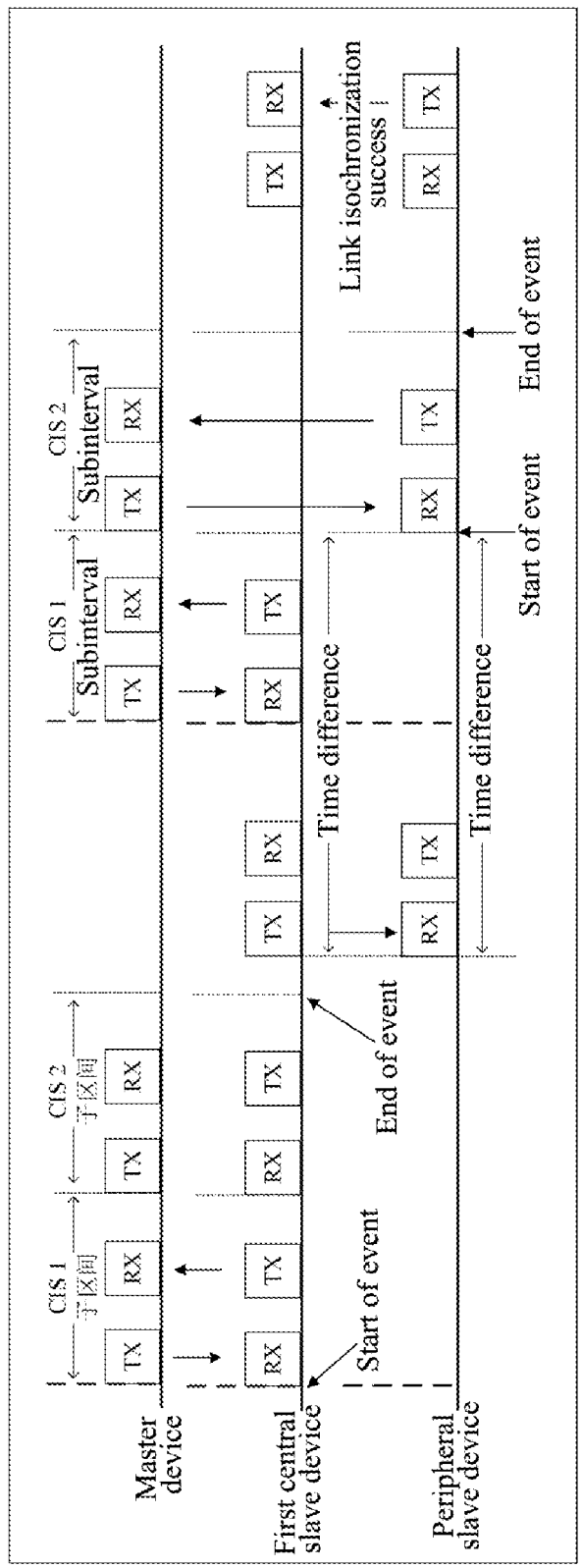
FIG. 5 is a timing diagram of multi-device data receiving and sending based on an isochronous channel provided by an embodiment of the present application.

In order to introduce the stop time more clearly, FIG. 5 is a timing diagram of multi-device data receiving and sending based on an isochronous channel provided by an embodiment of the present application. As shown in FIG. 5, according to the time sequence, in a first CIS1 subinterval and CIS2 subinterval, there is only the first central slave device as the slave device. At this time, the master device sends data to the first central slave device, and the first central slave device receives data, which realizes the data transmission between the master device and the slave device. After the peripheral slave device establishes first communication channel connection with the first central slave device, the first central slave device sends first isochronization information to the peripheral slave device through the first communication channel. The first isochronization information includes first isochronization time information, and the first isochronization time information may be, for example, a time which is after completing transmitting the (N−1)th frame of data between the first central slave device and the master device and which is before starting to transmit the Nth frame of data between the peripheral slave device and the master device, for example, in FIG. 5, it may be before an event start time of the peripheral slave device and after the transmission of the (N−1)th frame of data is completed between the first central slave device and the master device, in the present embodiment, where N is greater than 0 and is an integer. The embodiments of the present application do not limit specific information of the first isochronization time information.

In another possible implementation, the step of the first central slave device stopping the data transmission with the master device through the first isochronous channel includes that: the first central slave device disconnects the first isochronous channel with the master device.

As shown in FIG. 2B, taking the peripheral slave device 1 joining the topology as an example, the first central slave device disconnects the first isochronous channel 1 with the master device.

Step S104: the peripheral slave device starts data transmission with the master device according to the channel parameter of the first isochronous channel.

The embodiments of the present application do not limit the manner in which the peripheral slave device starts the data transmission with the master device according to the channel parameter of the first isochronous channel. In a possible implementation, the first isochronization information includes first isochronization time information, and the step of the peripheral slave device starts the data transmission with the master device according to the channel parameter of the first isochronous channel includes that:

the peripheral slave device determines a start time of starting the data transmission with the master device according to the first isochronization time information, where the start time is after completing transmitting the (N−1)th frame of data between the first central slave device and the master device through the first isochronous channel, and the start time is after the first central slave device stops the data transmission with the master device through the first isochronous channel; the peripheral slave device starts to transmit the Nth frame of data according to the channel parameter of the first isochronous channel with the master device at the start time.

As shown in FIG. 2B, taking the peripheral slave device 1 joining the topology as an example, the peripheral slave device 1 starts to transmit the Nth frame of data with the master device according to the channel parameter of the first isochronous channel, where the Nth frame of data is the next frame of the (N−1)th frame of data transmitted by the master device to the first central slave device through the first isochronous channel 1; and then the start time of starting the data transmission with the master device is determined through the first isochronization time information in the first isochronization information. For example, the first isochronization time information includes a sending time when the first central slave device sends the first isochronization information to the peripheral slave device, and a time difference between the sending time and a time of starting the data transmission between the peripheral slave device and the master device. The peripheral slave device 1 calculates the start time according to the sending time of the first central slave device sending the first isochronization information to the peripheral slave device and according to the time difference between the sending time and the time of starting the data transmission between the peripheral slave device and the master device. Finally, the peripheral slave device 1 starts to transmit the Nth frame of data with the master device at the start time.

As shown in FIG. 5, at the event start time of the peripheral slave device, that is, at a start time of the second CIS2 subinterval, the peripheral slave device starts to receive data sent by the master device and sends data to the master device to realize the data transmission between the peripheral slave device and the master device.

In another possible implementation, the step of the peripheral slave device starting the data transmission with the master device according to the channel parameter of the first isochronous channel includes that:

the peripheral slave device establishes a second isochronous channel with the master device according to the channel parameter of the first isochronous channel.

As shown in FIG. 2B, the peripheral slave device 1 establishes a second isochronous channel 1 with the master device according to the channel parameter of the first isochronous channel, where the second isochronous channel 1 has a channel parameter that is consistent with the channel parameter of the first isochronous channel 1 in FIG. 2A. In addition, the manner in which the peripheral slave device 2 joins the topology is the same as the manner in which the peripheral slave device 1 joins the topology, which will not be repeated.

In this process, before the peripheral slave device starts the data transmission with the master device according to the channel parameter of the first isochronous channel, the first central slave device stops the data transmission with the master device through the first isochronous channel. In this way, it is achieved that the peripheral slave device joins the topology, and interruption of data transmission is avoided in the process of the peripheral slave device joining the topology, thereby improving the switching efficiency of the isochronous channel topology and achieving seamless switching.

Optionally, in order to confirm whether the peripheral slave device has successfully joined the topology, the topology switching method based on an isochronous channel provided by the embodiment of the present application can further include that:

the peripheral slave device sends a channel isochronization success message or a channel isochronization failure message to the first central slave device, and the first central slave device receives the channel isochronization success message or the channel isochronization failure message sent by the peripheral slave device, where the channel isochronization success message is used to confirm success of data transmission between the peripheral slave device and the master device, and the channel isochronization failure message is used to confirm failure of data transmission between the peripheral slave device and the master device.

As shown in FIG. 5, after the peripheral slave device completes the data transmission with the master device, the peripheral slave device sends the channel isochronization success message to the first central slave device through the first communication channel, indicating that the isochronous channel between the peripheral slave device and the master device is successfully established. If the peripheral slave device does not receive the data sent by the master device at a first anchor point, the peripheral slave device can calculate the next ISO event through the ISO interval and try to receive data in the next ISO event. If CIS channel data is not received in a plurality of consecutive events, the channel isochronization failure message can be sent to the first central slave device through the first communication channel between the peripheral slave device and the first central slave device, so as to determine that the isochronous channel between the peripheral slave device and the master device fails to be established.

Figure 6:
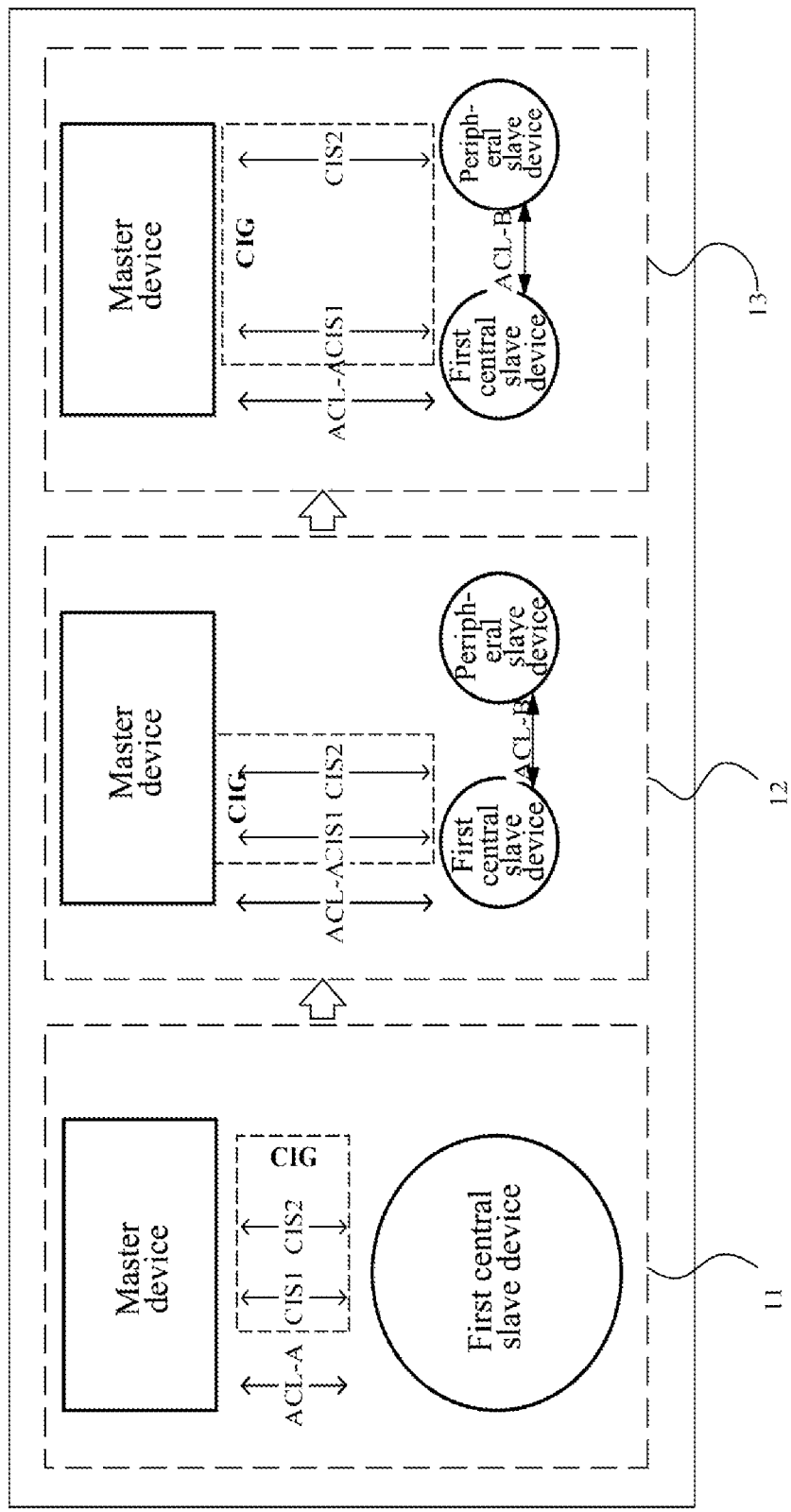
FIG. 6 is a schematic structural diagram of a topology switching based on an isochronous channel provided by another embodiment of the present application.

In order to facilitate understanding, a topological structure corresponding to the topology method based on an isochronous channel provided in the above embodiments is introduced below. FIG. 6 is a schematic structural diagram of a topology switching based on an isochronous channel provided by another embodiment of the present application. As shown in FIG. 6, a topological structure 11 shows that the first central slave device establishes one second communication channel ACL-A and a plurality of isochronous channels CIS1 and CIS2 with the master device, where the CIS1 and CIS2 belong to an isochronous group channel CIG; a topological structure 12 shows that the peripheral slave device joins a wireless communication local area network, the first central slave device establishes a first communication channel ACL-B with the peripheral slave device, and the peripheral slave device communicates with the first central slave device through the first communication channel ACL-B; a topological structure 13 shows that the peripheral slave device receives, through the first central slave device, data transmitted by the master device through the CIS2, and the first central slave device receives data sent by the master device through the CIS1 and stops receiving the data sent by the CIS2.

In the topology switching method based on an isochronous channel provided by the embodiments of the present application, the first central slave device sends the first isochronization information to the peripheral slave device, so that the peripheral slave device starts the data transmission with the master device according to the channel parameter of the first isochronous channel, and before the peripheral slave device starts the data transmission with the master device according to the channel parameter of the first isochronous channel, the first central slave device stops the data transmission with the master device through the first isochronous channel. The data transmission between the master device and the slave device is avoided to be disconnected during the process of establishing the isochronous channel between the master device and the newly added slave device, thereby improving the switching efficiency of the isochronous channel topology.

In actual application scenarios, there may be situations where the slave device departs. Taking a Bluetooth earphone as an example, for example, disconnecting a Bluetooth earphone from the master device, since the departing slave device may be the peripheral slave device or the first central slave device, the two situations will be introduced separately in the following.

Figure 7:
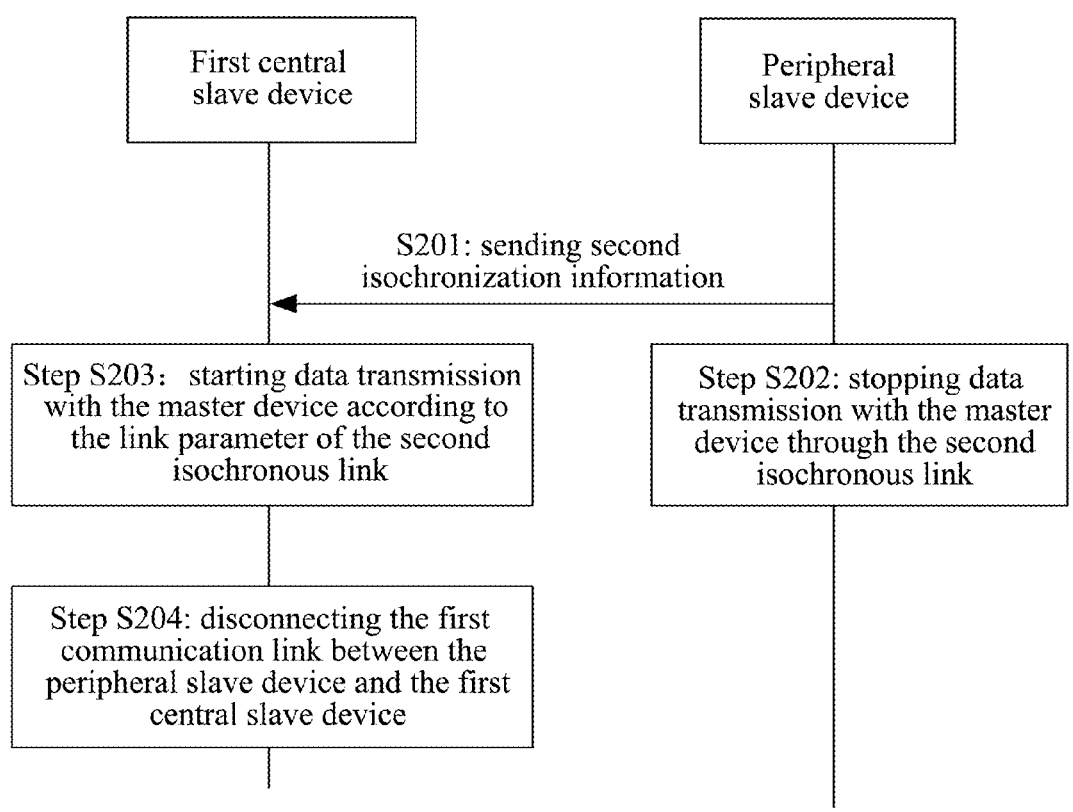
FIG. 7 is an interaction diagram of a topology switching method based on an isochronous channel provided by another embodiment of the present application.

In a possible implementation, FIG. 7 is an interaction diagram of a topology switching method based on an isochronous channel provided by another embodiment of the present application. As shown in FIG. 7, the topology switching method based on an isochronous channel provided by the embodiment of the present application can further include:

step S201: the peripheral slave device sends second isochronization information to the first central slave device.

If the peripheral slave device departs, the peripheral slave device will send the second isochronization information to the first central slave device. The second isochronization information includes a channel parameter of a second isochronous channel. The second isochronous channel is an isochronous channel between the peripheral slave device and the master device; the channel parameter of the second isochronous channel may include information such as the nearest anchor point of the current first communication channel, an event counter, a delay time, and a time difference, which is not limited in the embodiments of the present disclosure. The channel parameter of the second isochronous channel includes: a second data access address, so that the peripheral slave device stops the data transmission with the master device through the second isochronous channel; after the first central slave device receives the second isochronization information sent by the peripheral slave device, the first central slave device starts data transmission with the master device according to the second data access address.

The content of the second isochronization information is similar to that of the first isochronization information. Reference may be made to the introduction of the first isochronization information in the aforementioned embodiments, which is not repeated in the embodiments of the present application.

Figure 8:
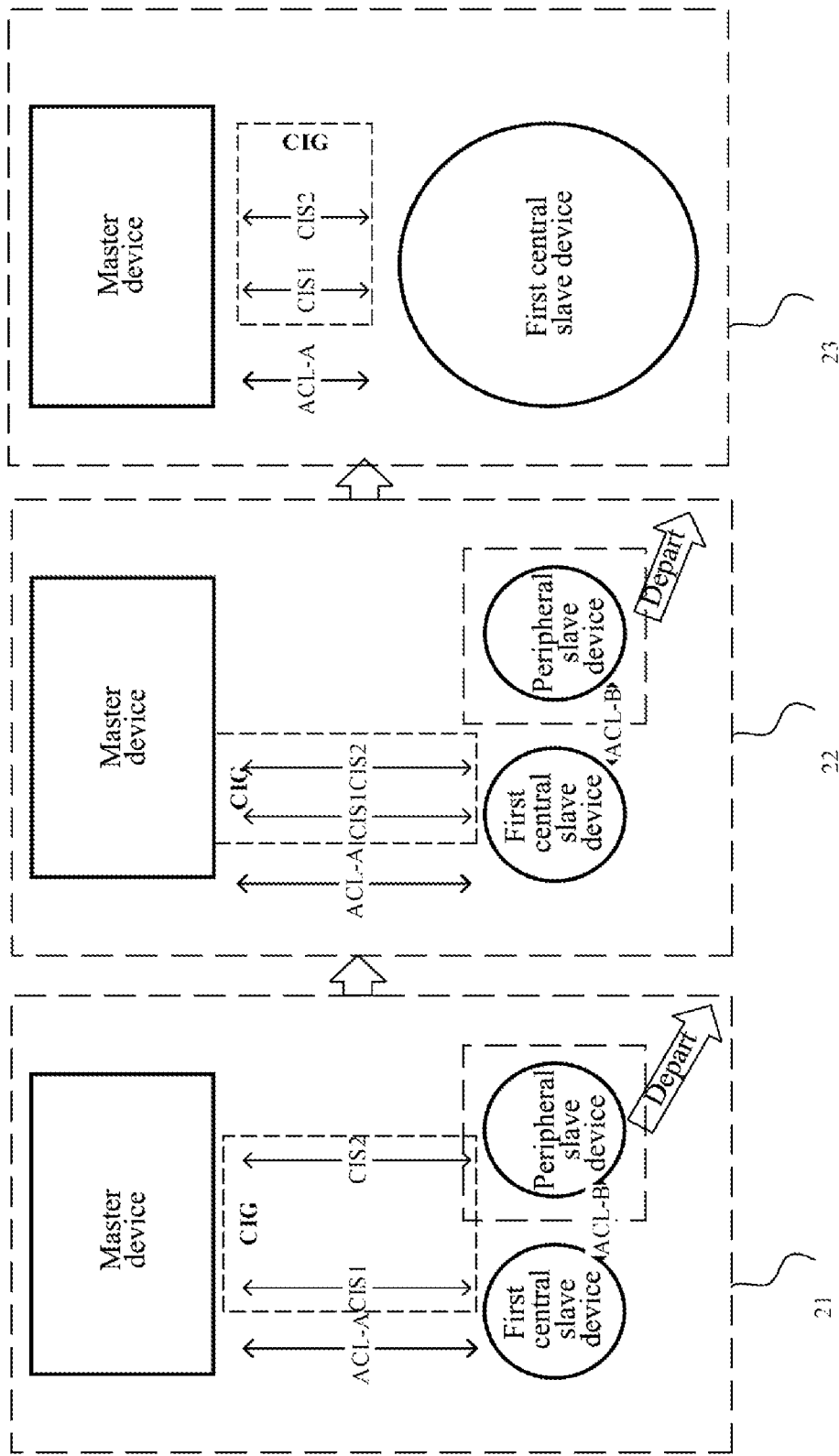
FIG. 8 is a schematic structural diagram of a topology switching based on an isochronous channel provided by still another embodiment of the present application.

FIG. 8 is a schematic structural diagram of a topology switching based on an isochronous channel provided by another embodiment of the present application. As shown in FIG. 8, a topological structure 21 shows that the first central slave device and the master device are connected through the first isochronous channel CIS1 and the second communication channel ACL-A; the peripheral slave device and the master device are connected through the second isochronous channel CIS2; the first communication channel ACL-B is established between the first central slave device and the peripheral slave device. When the peripheral slave device departs, the second isochronization information is sent to the first central slave device through the first communication channel ACL-B.

Step S202: the peripheral slave device stops data transmission with the master device through the second isochronous channel.

As shown in a topological structure 22 in FIG. 8, the peripheral slave device stops data transmission with the master device through the second isochronous channel CIS2. The content of the step S202 is similar to that of the step S103. For details, please refer to the step S103, which will not be repeated.

Step S203: the first central slave device starts data transmission with the master device according to the channel parameter of the second isochronous channel.

As shown in the topological structure 22 in FIG. 8, the first central slave device starts, according to the channel parameter of the second isochronous channel, the data transmission with the master device through the first isochronous channel CIS2. The content of the step S203 is similar to that of the step S104. For details, please refer to the step S104, which will not be repeated.

Step S204: the first central slave device disconnects the first communication channel between the peripheral slave device and the first central slave device.

As shown in FIG. 8, in a topological structure 23, the first central slave device disconnects the first communication channel ACL-B, and the peripheral slave device departs.

In this solution, the departure of the peripheral slave device is achieved, and in the process of the departure of the peripheral slave device, the data transmission between the master device and the slave device is not interrupted, which improves user experience. In addition, in the process of the departure of the peripheral slave device, the master device does not need to perform multi-device management, which improves the switching efficiency of the isochronous channel topology.

Figure 9:
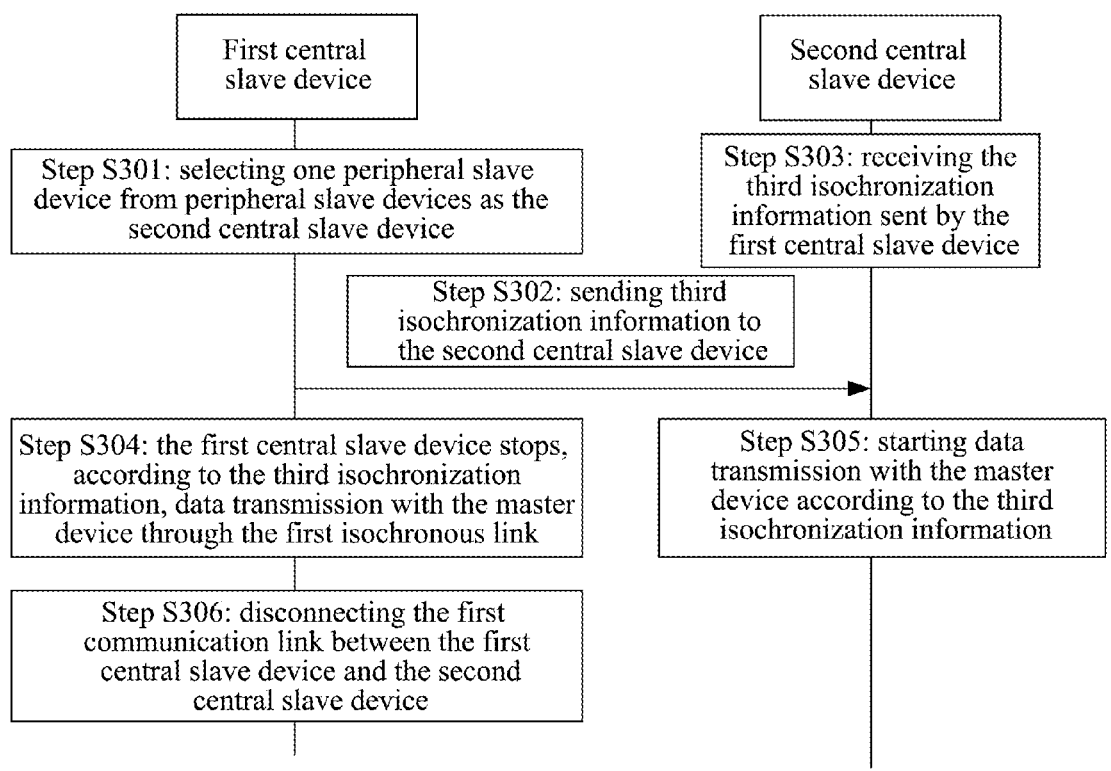
FIG. 9 is an interaction diagram of a topology switching method based on an isochronous channel provided by yet another embodiment of the present application.

In another possible implementation, FIG. 9 is an interaction diagram of a topology switching method based on an isochronous channel provided by another embodiment of the present application. As shown in FIG. 9, the topology switching method based on an isochronous channel provided by the embodiment of the present application can further include:

step S301: the first central slave device selects one peripheral slave device from the peripheral slave device as a second central slave device.

Figure 10:
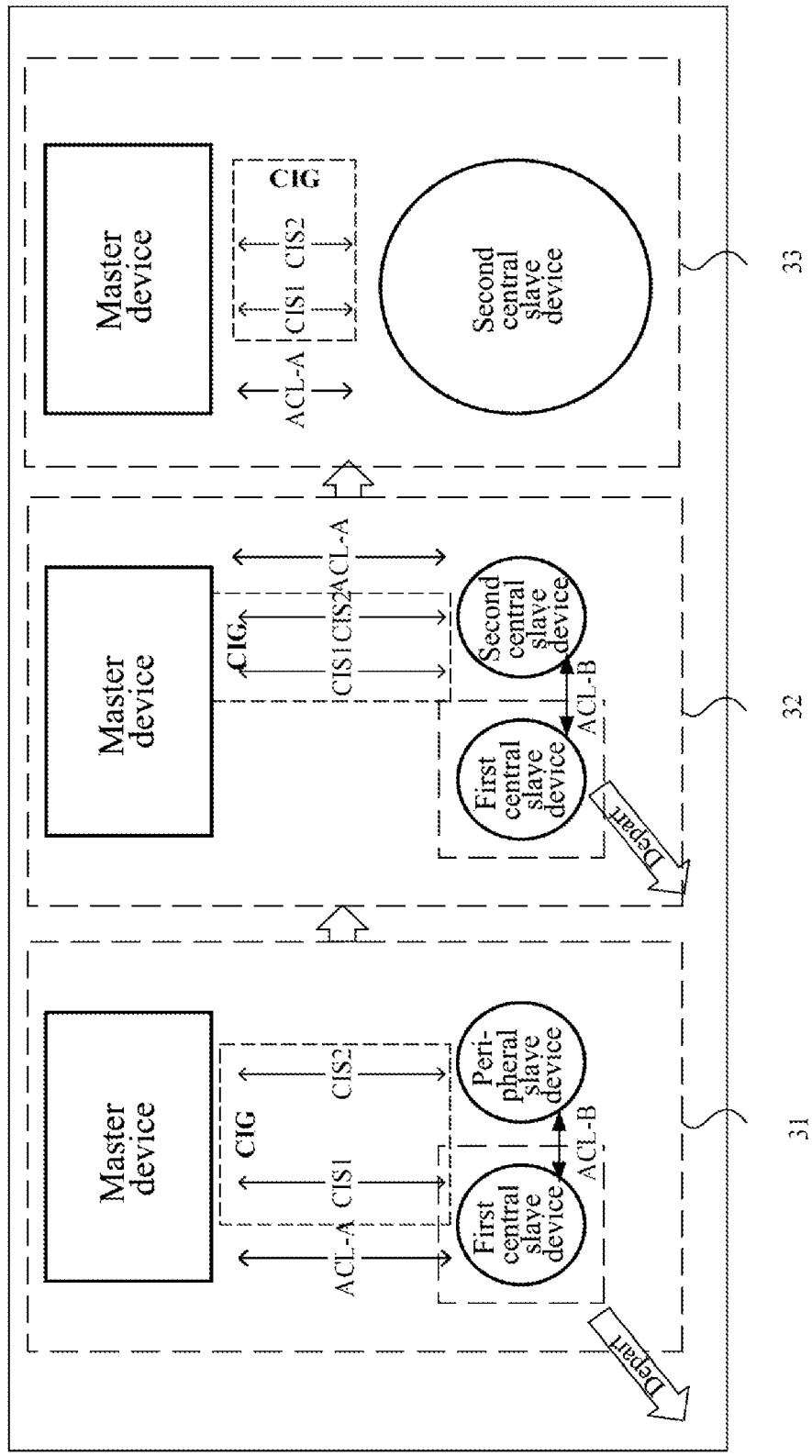
FIG. 10 is a schematic structural diagram of a topology switching based on an isochronous channel provided by yet another embodiment of the present application.

In a wireless local area network, there may be a plurality of peripheral slave devices. If the first central slave device departs, any one of at least one peripheral slave device can be selected as the second central slave device, which is not limited in the embodiments of the present application. The embodiments of the present application are introduced below by taking only one peripheral slave device as an example. FIG. 10 is a schematic structural diagram of a topology switching based on an isochronous channel provided by yet another embodiment of the present application. As shown in a topological structure 31 in FIG. 10, if the first central slave device is intended to depart, the peripheral slave device is selected as the second central slave device. The embodiments of the present application do not limit the manner of how to select the peripheral slave device as the second central slave device.

Step S302: the first central slave device sends third isochronization information to the second central slave device.

The third isochronization information is transmitted through the first communication channel between the second central slave device and the first central slave device, and the third isochronization information includes the channel parameter of the first isochronous channel and third isochronization time information. For the content of the third isochronization information, please refer to the introduction of the first isochronization information, which will not be repeated.

Step S303: the second central slave device receives the third isochronization information sent by the first central slave device.

For this step, please refer to the introduction of the step S102, which will not be repeated.

Step S304: the first central slave device stops, according to the third isochronization information, the data transmission with the master device through the first isochronous channel.

As shown in a topological structure 32 in FIG. 10, the first central slave device stops, according to the third isochronization information, the data transmission with the master device through the first isochronous channel CIS1. For the specific process, please refer to the content in the step S103, which will not be repeated. At the same time, the data transmission with the master device through the second communication channel ACL-A is also stopped.

Step S305: the second central slave device starts data transmission with the master device according to the third isochronization information.

As shown in the topological structure 32 in FIG. 10, the second central slave device starts data transmission with the master device through the first isochronous channel CIS1 according to the third isochronization information. For the specific process, please refer to the content in the step S104, which will not be repeated. At the same time, the data transmission with the master device through the second communication channel ACL-A is also started.

Step S306: the first central slave device disconnects the first communication channel between the first central slave device and the second central slave device.

The first central slave device disconnects the first communication channel ACL-B between the first central slave device and the second central slave device. For the topological structure at this time, please refer to a topological structure 33 in FIG. 10.

In this solution, the departure of the central slave device is achieved, and the interruption of data transmission between the master device and the slave device is avoided in the process of the departure of the central slave device, since the second central slave device starts the data transmission with the master device according to the third isochronization information, and thus the user experience is improved. In addition, in the process of the departure of the peripheral slave device, the master device does not need to perform multi-device management, which improves the switching efficiency of the isochronous channel topology.

In a process of transmitting data from the master device to the slave device, there may be a situation where the slave device fails to receive data sent by the master device through the isochronous channel. In view of the aforementioned application scenario, the topology switching method based on an isochronous channel provided by the embodiment of the present application can further include:

when the first central slave device fails to receive the data sent by the master device through the first isochronous channel, the first central slave device sends a data request message to the master device through the first isochronous channel until the number of times of the master device resending data requested by the data request message exceeds a preset threshold or until the first central slave device receives the data requested by the data request message, where the data request message is used to request the master device to resend the data requested by the data request message.

When the peripheral slave device fails to receive data sent by the master device through the second isochronous channel, the peripheral slave device sends a data request message to the master device through the second isochronous channel until the number of times of the master device resending data requested by the data request message exceeds a preset threshold or until the peripheral slave device receives the data requested by the data request message, where the data request message is used to request the master device to resend the data requested by the data request message.

Exemplarily, as shown in FIG. 2B, the master device establishes the first isochronous channel 3 with one first central slave device, and the master device establishes the second isochronous channel 1 and a second isochronous channel 2 with the peripheral slave device 1 and the peripheral slave device 2, respectively. If the first central slave device fails to receive the data sent by the master device through the first isochronous channel 3, the first central slave device sends a data request message to the master device through the first isochronous channel 3, so as to request the master device to resend the data that failed to be received; if the peripheral slave device 1 fails to receive the data sent by the master device through the second isochronous channel 1, the peripheral slave device 1 sends a data request message to the master device through the second isochronous channel 1, so as to request the master device to resend the data requested by the data request message, and so on, which will not be repeated.

Taking the first central slave device failing to receive the data sent by the master device through the first isochronous channel 3 as an example, after sending a data request message to the master device, the first central slave device still does not receive the data requested by the data request message from the master device. The first central slave device can resend the data request message to the master device through the first isochronous channel 3 until the first central slave device receives the data requested by the data request message sent by the master device or until the number of times of the master device resending the data requested by the data request message exceeds a preset threshold. The embodiments of the present application do not limit the setting mode of the preset threshold.

In this solution, different devices directly request retransmission from the master device according to respective isochronous channels between them and the master device, and respond according to the respective isochronous channels between them and the master device, which improves efficiency of data retransmission.

A topology switching apparatus based on an isochronous channel, a chip, a device, a system, a storage medium and a computer program product provided by the present application are described below. For the content and effect thereof, please refer to the method embodiments, which will not be repeated in the present application.

Figure 11:
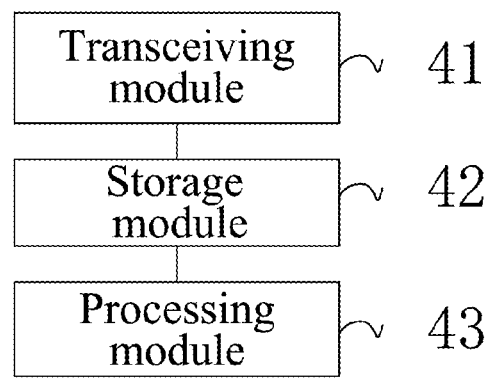
FIG. 11 is a schematic structural diagram of a topology switching apparatus based on an isochronous channel provided by an embodiment of the present application.

The present application provides a topology switching apparatus based on an isochronous channel. The apparatus can be implemented by software and/or hardware, and is applied to a first central slave device. There are a plurality of isochronous channels between the first central slave device and a master device, and there is a first communication channel between the first central slave device and at least one peripheral slave device. FIG. 11 is a schematic structural diagram of a topology switching apparatus based on an isochronous channel provided by an embodiment of the present application. As shown in FIG. 11, the apparatus provided by the embodiment of the present application can include: a transceiving module 41, a storage module 42 and a processing module 43, where the storage module 42 is configured to store computer executable instructions, so that when the processing module 43 executes the instructions, the topology switching methods based on an isochronous channel provided in the above-mentioned embodiments are implemented.

The transceiving module 41 is configured to send first isochronization information to the peripheral slave device through the first communication channel between the transceiving module 41 and the peripheral slave device. The first isochronization information includes a channel parameter of a first isochronous channel, so that the peripheral slave device starts data transmission with the master device according to the channel parameter of the first isochronous channel. The processing module 43 is configured to: stop data transmission with the master device through the first isochronous channel, before the peripheral slave device starts the data transmission with the master device according to the channel parameter of the first isochronous channel.

Optionally, the channel parameter of the first isochronous channel include: a first data access address; where the first data access address is used to enable the peripheral slave device to start the data transmission with the master device according to the first data access address. The processing module 43 is further configured to send the first data access address to the peripheral slave device, then the first central slave device stops the data transmission with the master device through the first isochronous channel according to the data access address, so that the peripheral slave device starts the data transmission with the master device according to the first data access address.

Optionally, the first central slave device stops the data transmission with the master device through the first isochronous channel, where the first isochronization information further includes first isochronization time information, and the processing module 43 is configured to: determine, according to the channel parameter of the first isochronous channel, the first isochronous channel that is used for the data transmission with the master device and is to be stopped. the first central slave device determines, according to the first isochronization time information, a stop time of stopping the data transmission with the master device through the first isochronous channel, where the stop time is after completing transmitting an (N−1)th frame of data between the first central slave device and the master device, and the stop time is before starting to transmit an Nth frame of data between the peripheral slave device and the master device. The data transmission with the master device through the first isochronous channel is stopped at the stop time.

Optionally, the first isochronization time information includes: a sending time when the first central slave device sends the first isochronization information to the peripheral slave device, and a time difference between the sending time and a time when the master device starts data transmission.

Optionally, the transceiving module 41 is further configured to: receive a channel isochronization success message or a channel isochronization failure message sent by the peripheral slave device, where the channel isochronization success message is used to confirm success of data transmission between the peripheral slave device and the master device, and the channel isochronization failure message is used to confirm failure of data transmission between the peripheral slave device and the master device.

Optionally, the transceiving module 41 is configured to receive second isochronization information sent by the peripheral slave device, where the second isochronization information includes a channel parameter of a second isochronous channel, the second isochronous channel is an isochronous channel between the peripheral slave device and the master device, and the second isochronous channel is used for data transmission between the peripheral slave device and the master device. The processing module 43 is configured to: make the peripheral slave device stop the data transmission with the master device through the second isochronous channel, before the first central slave device starts data transmission with the master device according to the channel parameter of the second isochronous channel; disconnect the first communication channel between the peripheral slave device and the first central slave device.

Optionally, the step of the peripheral slave device starting the data transmission with the master device according to the channel parameter of the first isochronous channel includes that: the peripheral slave device establishes the second isochronous channel with the master device according to the channel parameter of the first isochronous channel. The step of the first central slave device stopping the data transmission with the master device through the first isochronous channel includes that: the first central slave device disconnects the first isochronous channel with the master device.

Optionally, the channel parameter of the second isochronous channel include: a second data access address, so that the peripheral slave device stops the data transmission with the master device through the second isochronous channel. The processing module 43 is further configured to start the data transmission with the master device according to the second data access address, after receiving the second isochronization information sent by the peripheral slave device.

Optionally, the processing module 43 is configured to: select one peripheral slave device from the peripheral slave device as a second central slave device. The transceiving module 41 is configured to send third isochronization information to the second central slave device, where the third isochronization information is transmitted through the first communication channel between the second central slave device and the first central slave device, and the third isochronization information includes the channel parameter of the first isochronous channel and third isochronization time information. The processing module 43 is configured to stop, according to the third isochronization information, the data transmission with the master device through the first isochronous channel, and make the second central slave device start data transmission with the master device. The processing module 43 is further configured to disconnect the first communication channel between the first central slave device and the second central slave device.

Optionally, the processing module 43 is further configured to:
scan identity information of the peripheral slave device; identify the identity information of the peripheral slave device; establish the first communication channel between the peripheral slave device and the first central slave device, if the identity information of the peripheral slave device passes the identification.

Optionally, before sending the first isochronization information to the peripheral slave device through the first communication channel between the first central slave device and the peripheral slave device, it is further included that:

the first central slave device scans the identity information of the peripheral slave device and establishes the first communication channel between the peripheral slave device and the first central slave device; the first central slave device identifies the identity information of the peripheral slave device, and disconnects the first communication channel between the peripheral slave device and the first central slave device, if the identity information of the peripheral slave device fails to pass the identification.

Optionally, the processing module 43 is configured to:
when the first central slave device fails to receive data sent by the master device through the first isochronous channel, send a data request message to the master device through the first isochronous channel until the number of times of the master device resending data requested by the data request message exceeds a preset threshold or until the first central slave device receives the data requested by the data request message, where the data request message is used to request the master device to resend the data requested by the data request message.

Optionally, the transceiving module 41 is configured to: send a first request message to the master device through a second communication channel between the transceiving module 41 and the master device, where the first request message is used to request to establish the plurality of first isochronous channels; receive a response message sent by the master device through the second communication channel, where the response message is used to instruct to establish the plurality of first isochronous channels.

Figure 12:
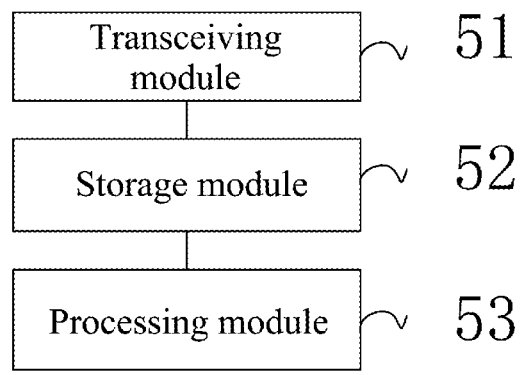
FIG. 12 is a schematic structural diagram of a topology switching apparatus based on an isochronous channel provided by another embodiment of the present application.

The present application provides a topology switching apparatus based on an isochronous channel. The apparatus can be implemented by software and/or hardware, and is applied to a peripheral slave device. There are a plurality of isochronous channels between a first central slave device and a master device, and there is a first communication channel between the first central slave device and the peripheral slave device. FIG. 12 is a schematic structural diagram of a topology switching apparatus based on an isochronous channel provided by another embodiment of the present application. As shown in FIG. 12, the apparatus provided by the embodiment of the present application can include: a transceiving module 51, a storage module 52 and a processing module 53, where the storage module 52 is configured to store computer executable instructions, so that when the processing module 53 executes the instructions, the topology switching methods based on an isochronous channel provided in the above-mentioned embodiments are implemented.

The transceiving module 51 is configured to: obtain first isochronization information from the first central slave device, where the first isochronization information includes a channel parameter of a first isochronous channel; make the first central slave device stop data transmission with the master device through the first isochronous channel, before the peripheral slave device starts data transmission with the master device according to the channel parameter of the first isochronous channel. The processing module 53 is configured to start data transmission with the master device according to the channel parameter of the first isochronous channel.

Optionally, the channel parameter of the first isochronous channel includes: a first data access address, where the first data access address is used to enable the peripheral slave device to start the data transmission with the master device according to the first data access address. The transceiving module 51 is configured to receive the first data access address, so that the first central slave device stops data transmission with the master device through the first isochronous channel according to the first data access address. The peripheral slave device starts the data transmission with the master device according to the first data access address.

Optionally, the processing module 53 is configured to:
start to transmit an Nth frame of data with the master device according to the channel parameter of the first isochronous channel. The first isochronization information includes first isochronization time information, and the peripheral slave device determines, according to the first isochronization time information, a start time of starting the data transmission with the master device, where the start time is after completing transmitting an (N−1)th frame of data between the first central slave device and the master device through the first isochronous channel, and the start time is after the first central slave device stops the data transmission with the master device through the first isochronous channel. The Nth frame of data is started to be transmitted with the master device at the start time.

Optionally, the first isochronization time information includes:

a sending time when the first central slave device sends the first isochronization information to the peripheral slave device, and a time difference between the sending time and a time when the master device starts data transmission.

Optionally, the transceiving module 51 is further configured to send a channel isochronization success message or a channel isochronization failure message to the first central slave device, where the channel isochronization success message is used to confirm success of data transmission between the peripheral slave device and the master device, and the channel isochronization failure message is used to confirm failure of data transmission between the peripheral slave device and the master device.

Optionally, the transceiving module 51 is configured to send second isochronization information to the first central slave device, where the second isochronization information includes a channel parameter of a second isochronous channel, and the second isochronous channel is an isochronous channel between the peripheral slave device and the master device. The processing module 53 is configured to: stop, according to the second isochronization information, the data transmission with the master device through the second isochronous channel, and make the first central slave device start the data transmission with the master device; disconnect the first communication channel between the peripheral slave device and the first central slave device.

Optionally, the step of the peripheral slave device starting the data transmission with the master device according to the channel parameter of the first isochronous channel includes that: the peripheral slave device establishes a second isochronous channel with the master device according to the channel parameter of the first isochronous channel, where the second isochronous channel is used for the data transmission between the peripheral slave device and the master device. The step of the first central slave device stopping the data transmission with the master device through the first isochronous channel includes that: the first central slave device disconnects the first isochronous channel between the first central slave device and the master device.

Optionally, the peripheral slave device is selected from a plurality of peripheral slave devices to serve as a second central slave device. The transceiving module 51 is configured to receive third isochronization information sent by the first central slave device, where the third isochronization information is transmitted through the first communication channel between the second central slave device and the first central slave device, and the third isochronization information includes the channel parameter of the first isochronous channel. The processing module 53 is configured to start data transmission with the master device according to the third isochronization information, and make the first central slave device stop the data transmission with the master device through the first isochronous channel; disconnect the first communication channel between the first central slave device and the second central slave device.

Optionally, the third isochronization information further includes third isochronization time information, so that the first central slave device determines, according to the third isochronization time information, a stop time of stopping the data transmission with the master device through the first isochronous channel, where the stop time is after completing transmitting an (M−1)th frame of data between the first central slave device and the master device, and the stop time is before starting to transmit an Mth frame of data between the second central slave device and the master device.

Optionally, the third isochronization time information includes:

a sending time when the first central slave device sends the third isochronization information to the second central slave device, and a time difference between the sending time and a time when the master device starts data transmission.

Optionally, the transceiving module 51 is configured to send identity information of the peripheral slave device to the first central slave device, so that the first central slave device scans and identifies the identity information of the peripheral slave device, to establish the first communication channel between the peripheral slave device and the first central slave device.

Optionally, the processing module 53 is configured to:

when the peripheral slave device fails to receive data sent by the master device through the second isochronous channel, send a data request message to the master device through the second isochronous channel, until the number of times of the master device resending data requested by the data request message exceeds a preset threshold or until the peripheral slave device receives the data requested by the data request message, where the data request message is used to request the master device to resend the data requested by the data request message.

An embodiment of the present application provides a chip for executing the topology switching method based on an isochronous channel provided by the above method embodiments. For the content and effect thereof, please refer to the method part, which will not be repeated.

An embodiment of the present application provides a central slave device, including the chip provided in the embodiments of the present application. For the content and effect thereof, please refer to the method part, which will not be repeated.

An embodiment of the present application provides a peripheral slave device, including the chip provided in the embodiments of the present application. For the content and effect thereof, please refer to the method part, which will not be repeated.

An embodiment of the present application provides a system. The system provided by the embodiment of the present application includes a master device, a central slave device, and at least one peripheral slave device. There are a plurality of isochronous channels between the central slave device and the master device, and there is a first communication channel between the central slave device and the at least one peripheral slave device.

The present application provides a computer storage medium, which includes computer instructions. When the instructions are executed by a computer, the computer implements the method provided in the embodiments of the present application. For the content and effect thereof, please refer to the method part, which will not be repeated.

The present application provides a computer program product, including computer instructions. When the instructions are executed by a computer, the computer implements the method provided in the embodiments of the present application. For the content and effect thereof, please refer to the method part, which will not be repeated.

Those skilled in the art would understand: all or part of the steps for implementing the aforementioned method embodiments can be completed by hardware related to program instructions. The aforementioned program can be stored in a computer readable storage medium. When the program is executed, the steps including the aforementioned method embodiments are performed; and the aforementioned storage medium includes: a ROM, a RAM, a magnetic disk, an optical disk or other media that can store program codes.

Finally, it should be noted that the above embodiments are merely used to illustrate the technical solutions of the present disclosure, and shall not be construed as limitation. Although the present disclosure has been described in detail with reference to the aforementioned embodiments, those skilled in the art should understand that it is still possible to modify the technical solutions described in the aforementioned embodiments, or equivalently substitute some or all of the technical features therein; and the modifications or substitutions do not cause the essence of the corresponding technical solutions to deviate from the scope of the technical solutions of the embodiments of the present disclosure.

What is claimed is:

1. A topology switching method based on an isochronous channel, wherein the method is applied to a first central slave device, there is a plurality of first isochronous channels between the first central slave device and a master device, and there is a first communication channel between the first central slave device and a first peripheral slave device the method comprising:
   sending, by the first central slave device, first isochronization information to the first peripheral slave device through the first communication channel between the first central slave device and the first peripheral slave device, wherein the first isochronization information comprises a channel parameter of a first isochronous channel, so that the first peripheral slave device starts data transmission with the master device according to the channel parameter of the first isochronous channel; and
   stopping, by the first central slave device, data transmission with the master device through the first isochronous channel, before the first peripheral slave device starts the data transmission with the master device according to the channel parameter of the first isochronous channel,
   wherein the first isochronization information further comprises first isochronization time information, and the stopping, by the first central slave device, of the data transmission with the master device through the first isochronous channel further comprises:
   determining, by the first central slave device and according to the channel parameter of the first isochronous channel, the first isochronous channel that is used for the data transmission with the master device and is to be stopped;
   determining, by the first central slave device and according to first isochronization time information, a stop time of stopping the data transmission with the master device through the first isochronous channel, wherein the stop time is after completing transmitting an (N−1)th frame of data between the first central slave device and the master device, and the stop time is before starting to transmit an Nth frame of data between the first peripheral slave device and the master device; and
   stopping, by the first central slave device, the data transmission with the master device through the first isochronous channel at the stop time.

2. The method according to claim 1, wherein the channel parameter of the first isochronous channel comprises: a first data access address; and
   the first data access address is used to enable the first peripheral slave device to start the data transmission with the master device according to the first data access address;
   wherein the first central slave device stops, according to the first data access address, the data transmission with the master device through the first isochronous channel, after the first central slave device sends the first data access address to the first peripheral slave device, so that the first peripheral slave device starts the data transmission with the master device according to the first data access address.

3. The method according to claim 1, wherein the first isochronization time information comprises:
   a sending time when the first central slave device sends the first isochronization information to the first peripheral slave device, and a time difference between the sending time and a time of starting the data transmission between the first peripheral slave device and the master device.

4. The method according to claim 1, further comprising:
   receiving, by the first central slave device, second isochronization information sent by a second peripheral slave device, wherein the second isochronization information comprises a channel parameter of a second isochronous channel, the second isochronous channel is an isochronous channel between the second peripheral slave device and the master device, and the second isochronous channel is used for data transmission between the second peripheral slave device and the master device;
   making the second peripheral slave device stop the data transmission with the master device through the second isochronous channel, before the first central slave device starts data transmission with the master device according to the channel parameter of the second isochronous channel; and
   disconnecting, by the first central slave device, the first communication channel between the second peripheral slave device and the first central slave device.

5. The method according to claim 4, wherein the step of the stopping, by the first central slave device, of the data transmission with the master device through the first isochronous channel comprises:
   disconnecting, by the first central slave device, the first isochronous channel with the master device.

6. The method according to claim 1, further comprising:
   selecting, by the first central slave device, one peripheral slave device from the first peripheral slave device as a second central slave device;
   sending, by the first central slave device, third isochronization information to the second central slave device, wherein the third isochronization information is transmitted through the first communication channel between the second central slave device and the first central slave device, and the third isochronization information comprises a channel parameter of an another first isochronous channel and third isochronization time information;
   stopping, by the first central slave device and according to the third isochronization information, the data transmission with the master device through the another first isochronous channel, and making the second central slave device start data transmission with the master device through the another first isochronous channel; and disconnecting, by the first central slave device, the first communication channel between the first central slave device and the second central slave device.

7. The method according to claim 1, wherein before sending, by the first central slave device, the first isochronization information to the first peripheral slave device through the first communication channel between the first central slave device and the first peripheral slave device, the method further comprises:
scanning, by the first central slave device, identity information of the first peripheral slave device;
identifying, by the first central slave device, the identity information of the first peripheral slave device; and
establishing the first communication channel between the first peripheral slave device and the first central slave device, if the identity information of the first peripheral slave device passes the identification; or
the method further comprises:
scanning, by the first central slave device, identity information of the first peripheral slave device, and establishing the first communication channel between the first peripheral slave device and the first central slave device;
identifying, by the first central slave device, the identity information of the first peripheral slave device; and
disconnecting the first communication channel between the first peripheral slave device and the first central slave device, if the identity information of the first peripheral slave device fails to pass the identification.

8. The method according to claim 1, further comprising: when the first central slave device fails to receive data sent by the master device through the first isochronous channel, sending, by the first central slave device, a data request message to the master device through the first isochronous channel until the number of times of the master device resending data requested by the data request message exceeds a preset threshold or until the first central slave device receives the data requested by the data request message, wherein the data request message is used to request the master device to resend the data requested by the data request message.

9. The method according to claim 1, further comprising:
sending, by the first central slave device, a first request message to the master device through a second communication channel between the first central slave device and the master device, wherein the first request message is used to request to establish the plurality of first isochronous channels; and
receiving, by the first central slave device, a response message sent by the master device through the second communication channel, wherein the response message is used to instruct to establish the plurality of first isochronous channels.

10. A topology switching method based on an isochronous channel, wherein the method is applied to a peripheral slave device there is a first communication channel between the peripheral slave device and a first central slave device, and there is a plurality of isochronous channels between the first central slave device and a master device wherein the method comprises:
obtaining, by the peripheral slave device, first isochronization information from the first central slave device, wherein the first isochronization information comprises a channel parameter of the first isochronous channel;
making the first central slave device stop data transmission with the master device through the first isochronous channel, before the peripheral slave device starts data transmission with the master device according to the channel parameter of the first isochronous channel; and
starting, by the peripheral slave device, the data transmission with the master device according to the channel parameter of the first isochronous channel,
wherein the first isochronization information comprises first isochronization time information, and the starting, by the peripheral slave device, the data transmission with the master device according to the channel parameter of the first isochronous channel further comprises:
determining, by the peripheral slave device and according to the first isochronization time information, a start time of starting the data transmission with the master device, wherein the start time is after completing transmitting an (N−1)th frame of data between the first central slave device and the master device through the first isochronous channel, and the start time is after the first central slave device stops the data transmission with the master device through the first isochronous channel; and
starting, by the peripheral slave device, to transmit an Nth frame of data with the master device according to the channel parameter of the first isochronous channel at the start time;
wherein the first isochronization time information comprises:
a sending time when the first central slave device sends the first isochronization information to the peripheral slave device, and a time difference between the sending time and a time of starting the data transmission between the peripheral slave device and the master device.

11. The method according to claim 10, wherein,
the channel parameter of the first isochronous channel comprises: a first data access address, and the first data access address is used to enable the peripheral slave device to start the data transmission with the master device according to the first data access address;
wherein the peripheral slave device receives the first data access address, so that the first central slave device stops, according to the first data access address, the data transmission with the master device through the first isochronous channel; and the peripheral slave device starts the data transmission with the master device according to the first data access address.

12. The method according to claim 10, comprising:
sending, by the peripheral slave device, second isochronization information to the first central slave device, wherein the second isochronization information comprises a channel parameter of a second isochronous channel, and the second isochronous channel is an isochronous channel between the peripheral slave device and the master device;
stopping, by the peripheral slave device and according to the second isochronization information, the data transmission with the master device through the second isochronous channel, and making the first central slave device start the data transmission with the master device; and
disconnecting, by the peripheral slave device, the first communication channel between the peripheral slave device and the first central slave device.

13. The method according to claim 10, wherein, the starting, by the peripheral slave device, the data transmission with the master device according to the channel parameter of the first isochronous channel comprises:

establishing, by the peripheral slave device, a second isochronous channel with the master device according to the channel parameter of the first isochronous channel, wherein the second isochronous channel is used for the data transmission between the peripheral slave device and the master device.

14. The method according to claim 13, further comprising:

receiving, by the peripheral slave device, third isochronization information sent by the first central slave device, wherein the peripheral slave device is selected as a second central slave device by the first central slave device, the third isochronization information is transmitted through the first communication channel between the peripheral slave device and the first central slave device, and the third isochronization information comprises a channel parameter of an another first isochronous channel;

starting, by the peripheral slave device, data transmission with the master device according to the third isochronization information, and making the first central slave device stop the data transmission with the master device through the another first isochronous channel; and disconnecting, by the peripheral slave device, the first communication channel between the first central slave device and the peripheral slave device.

15. The method according to claim 14, wherein, the third isochronization information further comprises third isochronization time information, so that the first central slave device determines, according to the third isochronization time information, a stop time of stopping the data transmission with the master device through the another first isochronous channel, wherein the stop time is after completing transmitting an (M−1)th frame of data between the first central slave device and the master device, and the stop time is before starting to transmit an Mth frame of data between the second central slave device and the master device;

wherein the third isochronization time information comprises:

a sending time when the first central slave device sends the third isochronization information to the second central slave device, and a time difference between the sending time and a time of starting the data transmission between the second central slave device and the master device.

16. A topology switching apparatus based on an isochronous channel, comprising:

at least one processor; and a memory in communicational connection with the at least one processor; wherein, the memory stores instructions executable by the at least one processor, and the instructions are executed by the at least one processor to enable the at least one processor to execute the topology switching method based on an isochronous channel according to claim 1.

17. A chip, comprising:

at least one processor; and a memory in communicational connection with the at least one processor; wherein, the memory stores instructions executable by the at least one processor, and the instructions are executed by the at least one processor to enable the at least one processor to execute the topology switching method based on an isochronous channel according to claim 1.

18. A chip, comprising:

at least one processor; and a memory in communicational connection with the at least one processor; wherein, the memory stores instructions executable by the at least one processor, and the instructions are executed by the at least one processor to enable the at least one processor to execute the topology switching method based on an isochronous channel according to claim 10.

* * * * *